US006956814B1

(12) United States Patent
Campanella

(10) Patent No.: US 6,956,814 B1
(45) Date of Patent: Oct. 18, 2005

(54) METHOD AND APPARATUS FOR MOBILE PLATFORM RECEPTION AND SYNCHRONIZATION IN DIRECT DIGITAL SATELLITE BROADCAST SYSTEM

(75) Inventor: S. Joseph Campanella, Gaithersburg, MD (US)

(73) Assignee: WorldSpace Corporation, Washington, DC (US)

( * ) Notice: Subject to any disclaimer, the term of this patent is extended or adjusted under 35 U.S.C. 154(b) by 832 days.

(21) Appl. No.: 09/640,686

(22) Filed: Aug. 18, 2000

Related U.S. Application Data

(60) Provisional application No. 60/185,701, filed on Feb. 29, 2000.

(51) Int. Cl.[7] ............................. H04B 7/185; H04Q 7/00
(52) U.S. Cl. ....................... 370/210; 370/314; 370/324; 370/516; 375/267; 375/347; 455/13.2
(58) Field of Search ................................ 370/204, 210, 370/312–314, 316, 319, 321, 324, 326, 350, 370/465–467, 503, 516; 375/260, 267, 346, 375/347, 362, 371; 455/436, 12.1, 13.2, 23, 455/61, 63.1, 65

(56) References Cited

U.S. PATENT DOCUMENTS

| 4,385,381 | A | 5/1983 | Alexis ...................... 370/69.1 |
| 4,881,241 | A | 11/1989 | Pommier et al. ............. 375/38 |
| 4,901,307 | A | 2/1990 | Gilhousen et al. ........... 370/18 |
| 5,191,576 | A | 3/1993 | Pommier et al. ............. 370/18 |
| 5,228,025 | A | 7/1993 | Le Floch et al. ............. 370/20 |
| 5,283,780 | A | 2/1994 | Schuchman et al. .......... 370/50 |
| 5,303,393 | A | 4/1994 | Noreen et al. ............... 455/3.2 |
| 5,319,673 | A | 6/1994 | Briskman ...................... 375/1 |
| 5,450,448 | A | 9/1995 | Sheynblat ................... 375/346 |
| 5,450,456 | A | 9/1995 | Mueller ...................... 375/224 |
| 5,454,009 | A | 9/1995 | Fruit et al. .................. 375/202 |
| 5,485,485 | A | 1/1996 | Briskman et al. ........... 375/200 |
| 5,550,812 | A | 8/1996 | Philips ........................ 370/19 |

(Continued)

FOREIGN PATENT DOCUMENTS

WO     WO 9949602 A1 *  9/1999    ............ H04H 1/00

OTHER PUBLICATIONS

Hoeher, P. et al., "Helicopter Emulation of Archimedes/Mediastar Satellite DAB Transmission to Mobile Receivers", International Journal of Satellite Communications, vol. 15, pp. 35-43 (1997).

(Continued)

Primary Examiner—Alpus H. Hsu
(74) Attorney, Agent, or Firm—Roylance, Abrams, Berdo & Goodman, L.L.P.

(57) ABSTRACT

A satellite system employing time diversity and a single frequency network of terrestrial re-radiation stations is provided wherein each terrestrial re-radiation station inserts a delay into a terrestrial signal. The delay allows the time of arrival of the early time diversity signal at the center of terrestrial coverage to coincide with the arrival of the corresponding late time diversity signal, thereby improving hand-off between terrestrial and satellite signals at a receiver. The delay also adjusts for distance differences between each terrestrial re-radiation station and the satellite and between each station and the center of the terrestrial coverage region. This adjustment optimizes the TDM-MCM reception by synchronizing at the center of the SFN the phase of the MCM signals re-radiated from the re-radiating stations of the SFN. The delay also compensates for the processing delay encountered when converting a satellite LOS TDM stream into a multicarrier modulated stream for transporting the satellite LOS TDM stream to user receivers and for the diversity delay between the early and late signals.

18 Claims, 11 Drawing Sheets

U.S. PATENT DOCUMENTS

| | | | | |
|---|---|---|---|---|
| 5,574,970 | A | | 11/1996 | Linquist et al. ............ 455/13.1 |
| 5,592,471 | A | | 1/1997 | Briskman ................... 455/52.3 |
| 5,659,353 | A | | 8/1997 | Kostreski et al. ............. 348/21 |
| 5,726,980 | A | | 3/1998 | Rickard ....................... 370/293 |
| 5,729,526 | A | | 3/1998 | Yoshida ....................... 370/206 |
| 5,794,138 | A | | 8/1998 | Briskman ................... 455/344 |
| 5,802,117 | A | | 9/1998 | Ghosh ......................... 375/344 |
| 5,835,487 | A | * | 11/1998 | Campanella ................ 370/316 |
| 5,864,579 | A | * | 1/1999 | Briskman ................... 375/130 |
| 5,867,490 | A | * | 2/1999 | Campanella ................ 370/326 |
| 5,991,345 | A | * | 11/1999 | Ramasastry ................. 375/347 |
| 6,128,276 | A | | 10/2000 | Agee ........................... 370/208 |
| 6,301,313 | B1 | * | 10/2001 | Gevargiz et al. ............ 375/340 |
| 6,510,317 | B1 | * | 1/2003 | Marko et al. ................ 455/428 |
| 6,724,827 | B1 | * | 4/2004 | Patsiokas et al. ........... 375/259 |

OTHER PUBLICATIONS

Tuisel, U. et al., "Carrier-Recovery for Multicarrier-Transmission Over Mobile Radio Channels", International Conference on Acoustics, Speech and Signal Processing, ICASSPGE, San Francisco, 1992, pp. 677-680.

F.C.C. Application of Satellite CD Radio, Inc. for Private CD Quality Satellite Sound Broadcasting System, May 18, 1990.

Terrestrial and Satellite Digital Sound Broadcasting to Vehicular Portable and Fixed Receivers in the VHF/UHF Bands, International Telecommunication Union, Radio Communication Bureau, Geneva, 1995, pp. 18-34, 48-49, 87-93, 118, 162, 168-172, 183, Annex C, Table of Contents and Description of Digital System B.

Principles for the Guidance of EBU Members for WARC-92 Broadcasting-Satelite Service, European Broadcasting Union, Feb. 1991 Draft SPB 483-E, pp. 7, 16.

Le Floch et al., "Digital Sound Broadcasting to Mobile Receivers", IEEE, Transactions on Consumer Electronics, Aug. 1989, vol. 35, No. 3, pp. 493-503.

"Proceedings from Second International Symposium on Digital Audio Broadcasting: The Sound 2000", Toronto, Canada, Mar. 14-17, 1994, vol. I, pp. 158-181 and vol. II, pp. 63-108 and pp. 240-248.

Annex C to ITU-R Special Publication on Terrestrial and Satellite Digital Sound Broadcasting to Vehicular Portable and Fixed Receivers in the VHF/UHF Bands on "Digital System B", Nov. 1, 1994.

Introduction of Satellite in Complimentary Terrestrial Digital Sound Broadcasting in the WARC-92 Frequency Allocations, International Telecommunication Union, Document 10/30-E, Feb. 22, 1995, pp. 7-9.

Miller, John E., "Application of Coding and Diversity to UHF Satellite Sound Broadcasting System", IEEE (1998), pp. 465-475.

"Mixed Satellite/Terrestrial Sound Broadcasting Service: Effect of a Co-Channel Satellite Service on a Terrestrial DSB Coverage", International Telecommunications Unit, Radio Communications Study Group, Document 10B-CAN-6, Oct. 8, 1993, pp. 1-8.

The Eureka 147 Project, Digital Audio Broadcasting System, DAB Project Office, Germany, pp. 1-11.

De Gaudenzi, R., "Analysis of an Advanced Satellite Digital Audio Broadcasting System and Complementary Terrestrial Gap-Filler Single Frequency Network", IEEE Transactions on Vehicular Technology, vol. 43, No. 2, May 1994, pp. 194-210.

Linnartz, Jean-Paul M.G. et al., "Wireless Personal Communication", Special Issue on 'Multi-Carrier Modulation', No. 1-2, pp. 1-8 (1996).

Zheng, H. et al., "Subband Coded Image Transmitting Over Noisy Channels Using Multicarrier Modulation", Technical Research Report R.R. 98-20, Institute for Systems Research.

* cited by examiner

METHOD AND APPARATUS FOR MOBILE PLATFORM RECEPTION AND SYNCHRONIZATION IN DIRECT DIGITAL SATELLITE BROADCAST SYSTEM

This application claims the benefit of the U.S. provisional application Ser. No. 60/185,701, filed Feb. 29, 2000.

CROSS REFERENCE TO RELATED APPLICATIONS

Related subject matter is disclosed in U.S. patent application Ser. No. 09/058,663, filed Apr. 10, 1998 (abandoned) which claims the benefit of U.S. Provisional Patent Application Ser. No. 60/079,591, filed Mar. 27, 1998; and International PCT Application No. PCT/US98/14280, filed Jul. 10, 1998, the entire contents of each application being expressly incorporated herein by reference.

FIELD OF THE INVENTION

The invention relates to a method and apparatus for reception and synchronization in a direct digital satellite broadcast system using line-of-sight (LOS) satellite-only reception, or LOS reception with terrestrial re-radiation.

BACKGROUND OF THE INVENTION

Receivers in existing systems which provide terrestrial and/or satellite digital audio radio service (DARS) have been radically affected by blockage, shadowing and multipath effects which create severe degradations in signal quality, such as signal fading and inter-symbol interference (ISI) due to multipath. These effects on broadcast channels to receivers can be sensitive to location and frequency, particularly in an urban environment or geographic areas with high elevations where blockage of line of sight (LOS) signals from satellites is most prevalent.

Signal blockages at portable and mobile receivers can occur due to physical obstructions between a transmitter and the receiver. Mobile receivers, for example, encounter physical obstructions when they pass through tunnels or travel near buildings or trees that impede line of sight (LOS) satellite signal reception. Service outages can also occur when cancellations caused by multipath signal reflections are sufficiently high with respect to the desired signal.

Locations directly beneath a satellite (hereinafter referred to as the sub-satellite point) inherently have the highest LOS elevation angles, while locations that depart from the sub-satellite point inherently have decreasing LOS elevation angles and, accordingly, increasing likelihood of blockage and shadowing. Outdoor locations that are near the sub-satellite point typically enjoy virtually unblocked LOS reception. Thus, the need for terrestrial re-radiation of potentially blocked LOS signals is minimal. When the LOS elevation angle to the satellite becomes less than about 85 degrees, however, blockage by tall buildings or geological elevations (i.e., on the order of 30 meters) becomes significant. Terrestrial re-radiation for gap filling is needed to achieve satisfactory coverage for mobile radios, as well as static and portable radios. In areas where the heights of buildings or geological obstructions are relatively low (i.e., on the order of less than 10 meters), blockage is not significant until the distance from the sub-satellite point exceeds 1400 km, causing the LOS elevation angle to become lower than 75 degrees. For distances of 6300 km from the sub-satellite point, the elevation angle falls below 250 and the need for terrestrial re-radiation of the satellite signal increases significantly.

Thus, at the mid and high latitude locations within the coverages of one or more broadcast satellites, terrestrial re-radiation is needed to achieve suitable radio reception. For successful implementation of the reception by a mobile radio of direct LOS satellite signals and their combination with the same signals terrestrially re-radiated, near relative synchronization and combination of the satellite direct LOS signals with those repeated over the terrestrial network is needed at the receive site. Also, near synchronization among the signals re-radiated from the various terrestrial stations is needed at the receive sites.

SUMMARY OF THE INVENTION

The above-described disadvantages are overcome and a number of advantages are realized by combining satellite direct LOS time diversity signals, or satellite direct LOS time and space diversity signals, with re-radiated terrestrial diversity signals, which are generated as a result of the satellite direct LOS signal received at the terrestrial station being re-radiated as a ground wave into the region of the city and its suburbs. By doing this, the direct LOS satellite time or time and space diversity signals can be received jointly with a terrestrial re-radiated signal of the properly delayed satellite direct LOS signal to create satellite/terrestrial diversity reception. By this means, a mobile receiver can travel in areas where satellite direct LOS signals are prevalent, or in the city and its surrounding suburbs where terrestrial re-radiated signals are most prevalent, or make transitions between the two types of areas without disrupting the continuity of reception. To achieve essentially perfect continuity, the arrival times of the satellite direct line of sight signals and the re radiated terrestrial signals are synchronized to within 10 milliseconds.

In accordance with an aspect of the present invention, centers of coverage are defined for groups of terrestrial re-radiation stations. Signals emitted from each of a number of terrestrial re-radiation stations are corrected to compensate for differences in distance between respective ones of the terrestrial re-radiation stations and the approximate center of coverage.

In accordance with another aspect of the present invention, satellite signals re-radiated from a terrestrial station are corrected to compensate for differences in times of arrival of the early signal from the satellite at respective ones of the terrestrial re-radiation stations.

In accordance with yet another aspect of the present invention, signals emitted from a terrestrial re-radiation station are corrected to compensate for delay in generating a terrestrial signal using a satellite signal at a terrestrial re-radiation station.

In accordance with still yet another aspect of the present invention, symbols in a time division multiplexed data stream arriving at a terrestrial re-radiation station are aligned with multicarrier modulated symbols in a multicarrier modulated/time division multiplexed waveform.

In accordance with another embodiment of the present invention, at least one approximate center of coverage is defined among a selected number of said terrestrial re-radiation stations that are geographically separated. The respective differences in distance between each of the selected number of the terrestrial re-radiation stations and the approximate center of coverage are determined. The terrestrial signal is then corrected to compensate for different times of arrival of the terrestrial signal transmitted from the selected number of the terrestrial re-radiation stations at a user terminal due to differences in distance between respective ones of the selected number of the terrestrial re-radiation stations and the approximate center of coverage.

In accordance with another embodiment of the present invention, an apparatus for use at a terrestrial re-radiation station receives a time division multiplexed data stream comprising symbols, each of said symbols corresponding to a selected number of bits in the data stream. A processing device connected to the receiving device locates a master frame preamble in the data stream. The processing device transforms the symbols in the TDM data stream into respective OFDM subcarriers to generate a time division multiplexed/multicarrier modulated (TDM-MCM) waveform comprising multicarrier modulated symbols, each having a selected number of subcarriers that transport the time series symbols of a TDM waveform. The processing device is some times referred to as a TDM to MCM transmultiplexer. The processing device employs the TDM master frame preamble, or alternatively a unique code distributed over the entire TDM frame, to synchronize the symbols in the data stream with corresponding ones of subcarriers in respective multicarrier modulated symbols.

In accordance with another embodiment of the present invention, each re-radiation transmitter re-radiates a high power TDM-MCM signal using ground wave propagation in a city or from hilltops or along roadways from antennas on towers at heights sufficient to reach distances from 1 to 20 km as appropriate.

BRIEF DESCRIPTION OF DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 1A:
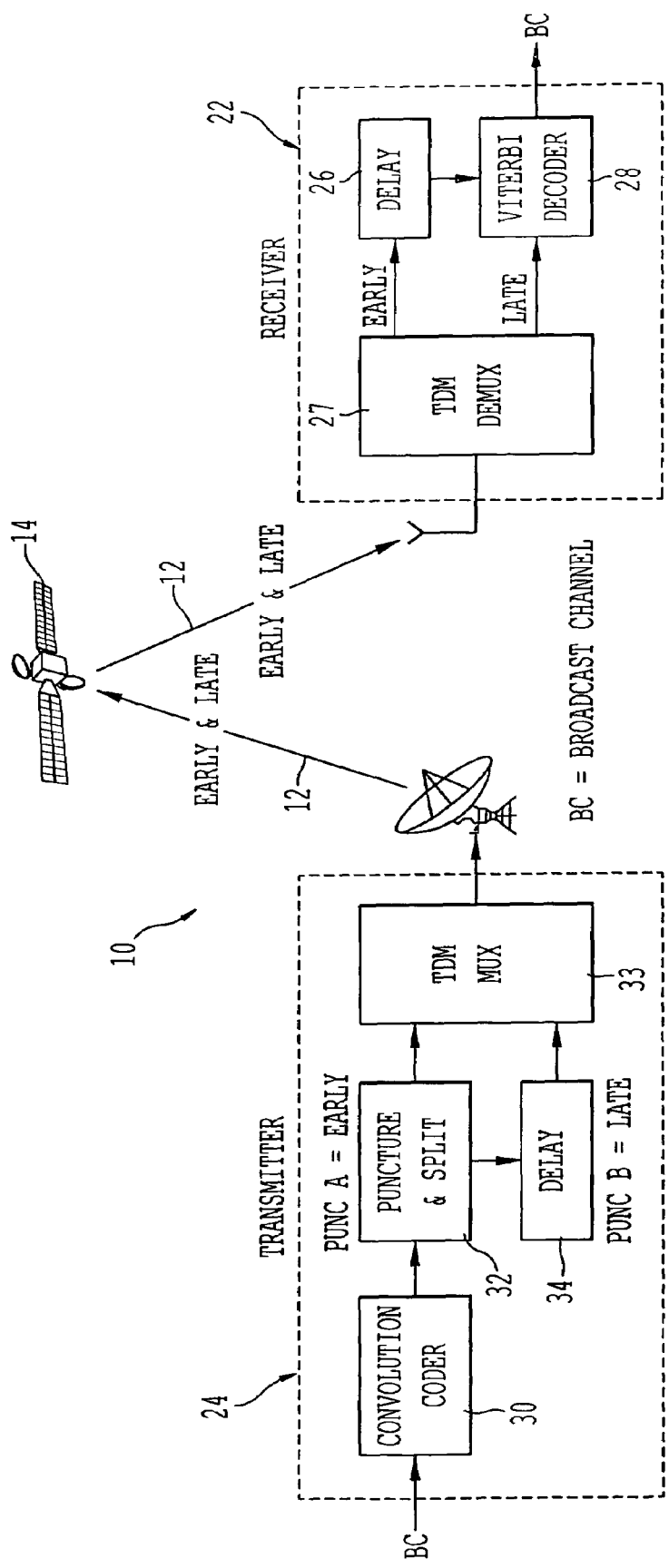
FIGS. 1a and 1b each depict a broadcast system using one satellite for transporting time diversity signals constructed in accordance with an embodiment of the present invention.

Satellite communication systems can employ time diversity, or time and space diversity combined, to mitigate the undesirable effects of blockage, shadowing, fading multipath. For example, a time diversity communication system can transmit early and late satellite signals (i.e., one signal is delayed by a selected time interval with respect to the other signal) in a single direct LOS data stream. Alternatively, a time diversity communication system can transmit the early and late signals via respective ones of two direct LOS data streams. The duration of the time interval between early and late is determined by the duration of the service outage due to blockage to be avoided. Experimental evidence referred to herein gives guidance to the magnitude of the delay needed. Also, the two direct LOS data streams can be transmitted by respective ones of two satellites that are separated in space to implement space diversity, as well as time diversity. In both cases, the non-delayed channel is delayed either at the terrestrial re-radiation transmitter and/or at the receiver so that the early and late channels can be constructively combined.

Either of the above-referenced direct LOS satellite diversity implementations can be combined with a network of terrestrial re-radiation stations to overcome the blockage caused by buildings, bridges and tunnels encountered in both urban centers and metropolitan locations where direct LOS reception from satellites is not always available. A terrestrial network can contain from one to any number of stations as needed for achieving a desired coverage. To use terrestrial re-radiation of direct satellite signals, the present invention provides for conversion of the satellite TDM signal to a multicarrier modulation waveform which is inherently resistive to and robust in the kind of multipath environment expected in ground wave propagation in central business districts and their surrounding metropolitan areas. The present invention provides means to synchronize and combine the satellite direct LOS signals with a repetition of the satellite signal over the terrestrial re-radiation network to achieve continuous, uninterrupted reception when traveling in satellite-only coverage areas, in the terrestrial reinforced city coverage areas, as well as when transiting between the two types of areas.

To generate the terrestrial signal the TDM data symbol stream received from the satellite is converted to a multicarrier modulated waveform. This is accomplished by means of an IFFT transform in which TDM stream data symbols are synchronously and precisely assigned to individual TDM-MCM subcarriers in the same way at all terrestrial re-radiation stations of a terrestrial single frequency network. The TDM-MCM waveform is known to be resistive to multipath and yields robust reception in areas where line-of-sight reception is severely blocked.

1. Mobile Reception Via Line-of-Sight from Satellites.

Signal transport using electromagnetic waves directly between satellite transmitters and mobile receivers is addressed in the following. As stated previously, signal blockages at receivers can occur due to physical obstructions between a transmitter and the receiver. In addition, service outages can occur due to signal fading, cancellations and carrier phase perturbations. Mobile receivers, for example, encounter blockage by physical obstructions when they pass through tunnels or travel near buildings or trees that impede line of sight (LOS) signal reception. Service outages can occur, on the other hand, due to signal cancellations, fading and carrier phase perturbations when interfering multipath signal reflections are sufficiently high with respect to the desired signal.

Satellite communication systems can employ time diversity only, space diversity only or time and space diversity together to mitigate the undesirable effects of direct line-of-sight blockage, shadowing and multipath fades. For example, as shown in FIG. 1a, a time diversity only satellite communication system 10 can transmit early and late versions of the same signal in a single direct LOS data stream 12 over the satellite 14 (i.e., the late signal is a replica of the early signal but delayed by a selected time interval). Alternatively, as shown in FIG. 1b, a time diversity only communication system 10 can transmit one LOS data stream 18 transporting only the early signals and another LOS data stream transporting only late signals over satellite 14.

Figure 2:
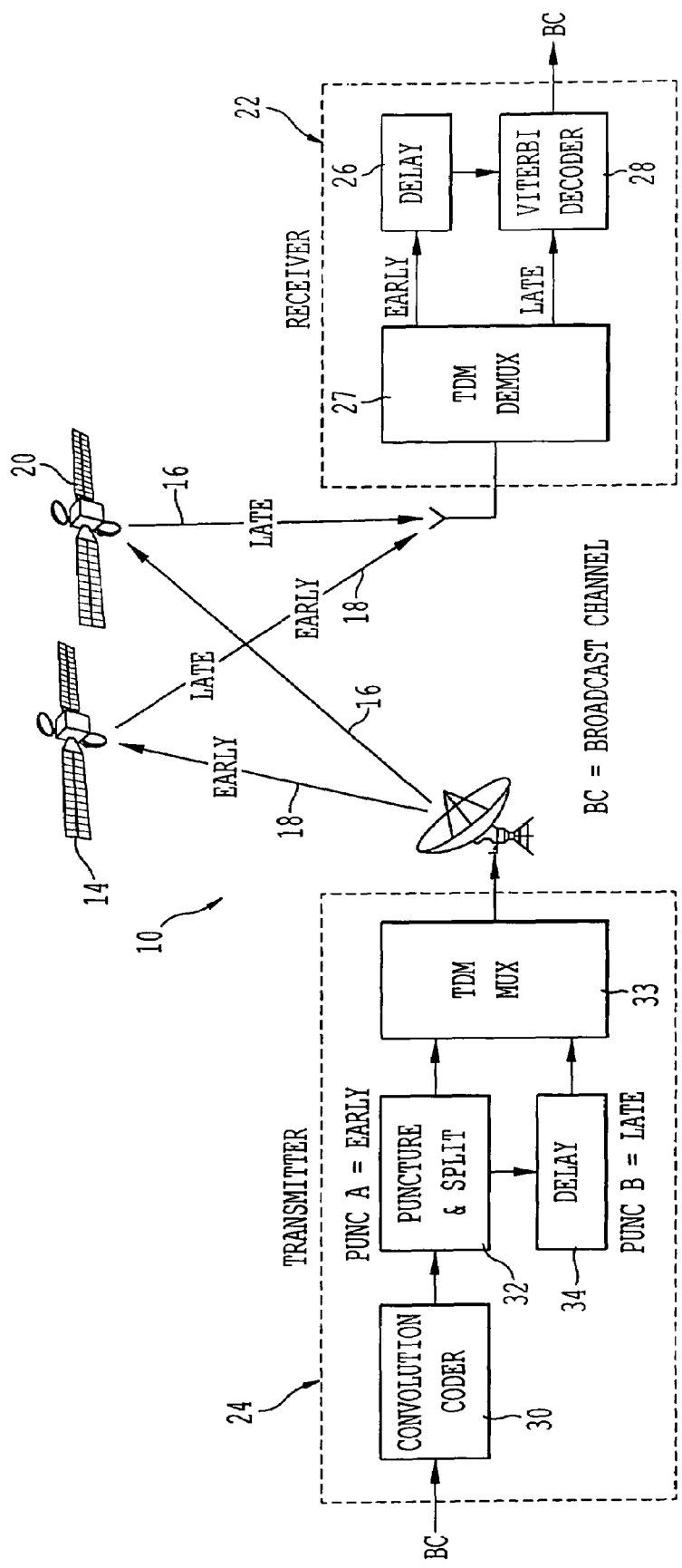
FIG. 2 depicts a broadcast system using two satellites for transporting time and space diversity signals constructed in accordance with an embodiment of the present invention.

A satellite communication system combining space and time diversity is shown in FIG. 2. Two direct LOS data streams 16 and 18 can be transmitted by respective ones of two satellites 14 and 20 that are separated in space by a distance sufficient to implement space diversity. Time diversity is implemented either by transporting a mix of early and late companion signals on each data stream, or by transporting all early signals on one data stream and all late signals on the other data stream.

Figure 1B:
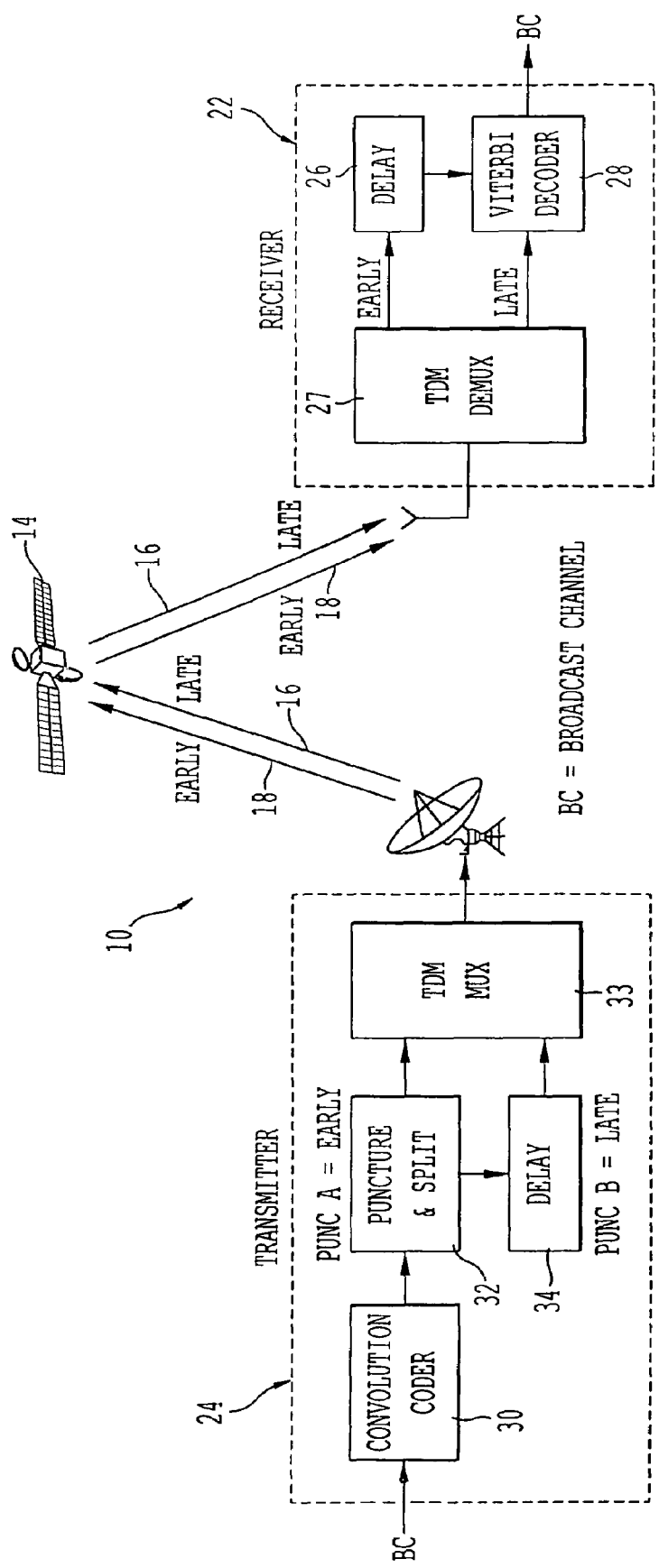

For either of the system configurations of FIG. 1a, FIG. 1b or FIG. 2, the non-delayed signals (i.e., the early satellite signal) is delayed at a receiver 22 so that it can be synchronously combined with its late companion signal into one signal. A maximum likelihood method to perform this combining is discussed below.

The signals referred to in FIG. 1a, FIGS. 1b and 2 are preferably broadcast channels (BCs) that carry individual broadcast programs. Individual broadcast programs are assigned to two broadcast channels. One broadcast channel carries the broadcast program undelayed (hence called early). The second channel carries the same broadcast program except that it is delayed (hence called late). These early and late broadcast channels can be considered being carried companion signals, with one channel being carried on either transport carrier and the other channel being carried simultaneously on the opposite transport carrier.

With reference to the satellite signal 12 depicted in FIG. 1a, a receiver 22 in a system 10 that employs only one direct LOS stream from one satellite 14 for time diversity need only to receive one time division multiplexed TDM carrier to implement this operating mode. To do this, the receiver uses one RF section that receives the TDM carrier. In this situation, for each mobile broadcast program, two direct LOS mobile reception broadcast channels are sent in the same TDM stream. The symbols of each broadcast channel are time division multiplexed 33 within the frames of a TDM carrier along with those of other broadcast channels. One broadcast channel carries an early signal, and the other broadcast channel carries a late signal. This process provides time diversity at the receiver 22 that enhances the availability of continuous, uninterrupted reception under dynamic blockage events that can occur with a vehicle moving along a highway, for example.

With reference to the satellite signals 16 and 18 depicted in FIG. 1b, whereby a system 10 recovers two TDM streams 27 and demultiplexes and decodes the appropriate broadcast channels from these TDM streams, a receiver 22 is equipped to receive and process two TDM satellite carriers. To do this, the receiver 22 has a radio frequency (RF) section that is capable of receiving two satellite TDM carriers. A single RF section that has sufficient bandwidth to receive two RF TDM carriers can be used. Such a design is particularly applicable when the two TDM carriers are arranged in their spectrum so as to be contiguous to one another. However, there may be circumstances where the two carriers cannot be placed in contiguous proximity and must be separated in their spectrum locations to make a single RF section possible. In this situation, two separate and independent RF sections are properly located and implemented so as to receive the two carriers. The arrangement with one RF section shall be referred to as a single arm satellite receiver, and the arrangement with two RF sections shall be referred to as a dual arm satellite receiver.

The duration of the time interval between early and late signals is determined by the duration of the service outage to be avoided. The duration of service outage is determined by the distribution and sizes of the blockers. In cities, blockers are most likely buildings of various heights and setbacks from the streets. In rural regions, blockers are likely to be trees flanking and overhanging a highway or country lane. In both cases, bridges and tunnels must also be considered. A documented investigation that gives guidance in the appropriate choice of the value of the delay for cities and highways is discussed below in connection with FIG. 3.

The delay time between the early and late signals is preferably a system parameter that is a function of the physical distribution of LOS blockers and the speed of the vehicle. The choice of this delay value for vehicles traveling along typical rural highways at typical speeds (30 to 60 mph) is selected to be long enough to cover the distribution of the blockages encountered. A value of delay is selected that is preferably of sufficient duration to eliminate preferably 97 to 99% of the blockages, but is not so long as to encumber receiver construction (e.g., such as to make the complexity and/or the cost of a receiver to be commercially undesirable). As an example of the duration of such a blockage, a car passing under a bridge 50 ft wide at 30 mph is considered. The LOS to the satellite is blocked for 1.136 seconds, and the delay of the late signal is at least equal to this value.

Figure 3:
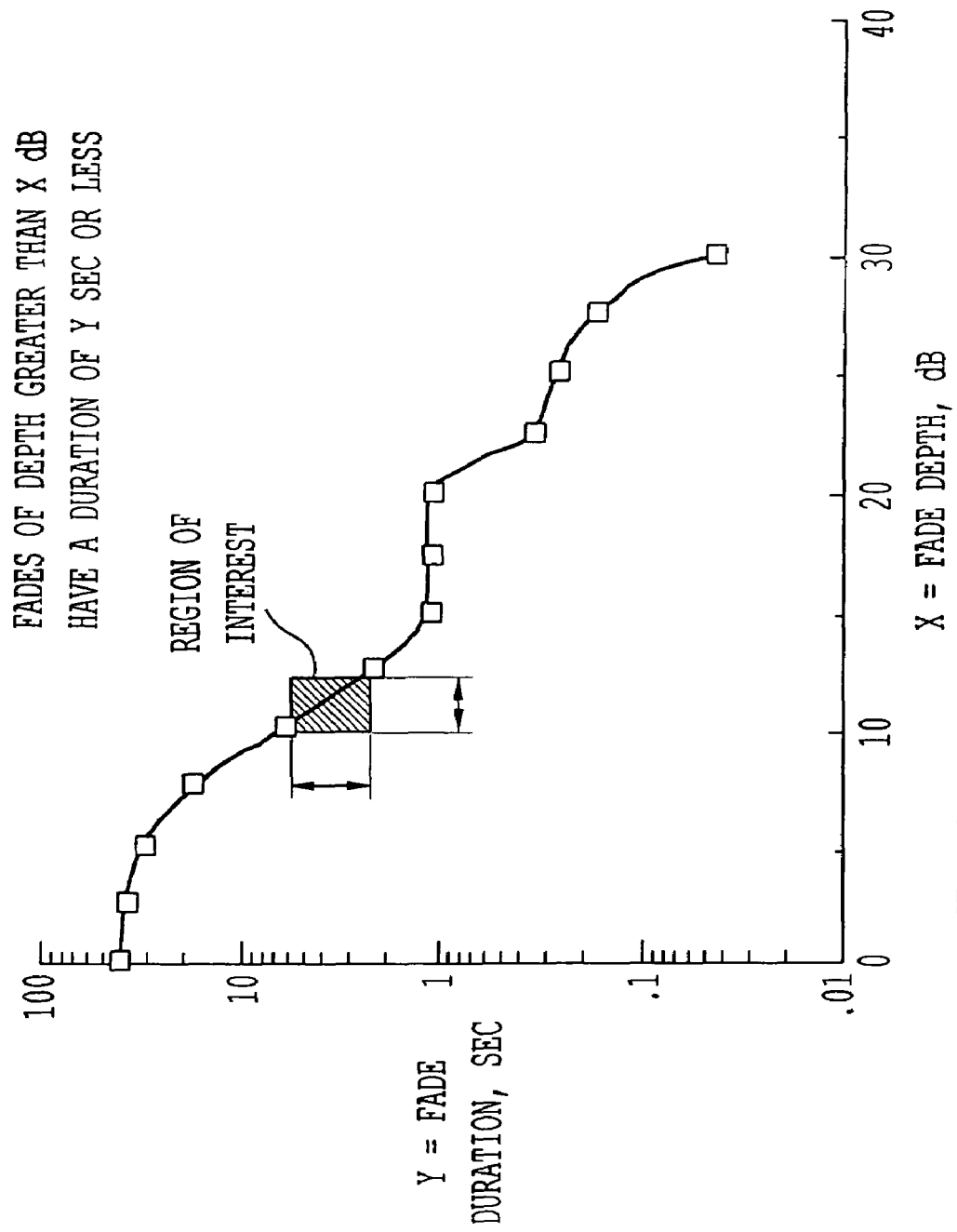
FIG. 3 is a graph illustrating fade duration versus fade depth and identifies delays that optimize time diversity reception.

Measurements of blockages have been conducted on rural highways, as discussed in Lutz et al., "Land Mobile Satellite Communications—Channel Model, Modulation and Error Control", Proceedings ICDSC-7 International Conference on Digital Satellite Communications, May 12–16, 1986. Using data from this, a graph of the fraction of blockage encountered versus the available depth of fade margin for a mixture of obstacles such as bridges, roadside structures, buildings and trees has been plotted. This data, provided in FIG. 3, shows that for a fade depth margin of 12 dB, the delay time lies between 2 and 8 seconds. Fade depth margin is the difference between the signal level arriving from the satellite and that which causes the received signal to become unacceptable. Thus, for example, if the satellite signal is sufficiently strong to achieve a fade margin of 12 dB, from FIG. 3, it is seen that a delay time of 6 to 8 seconds can provide near maximum benefit from time diversity reception.

Another means of enhancing satellite signal reception in the mobile situation is an interleaver. The purpose of an interleaver is to combat bursts of bit or symbol errors that can result from the vagaries of transmission caused by multipath flat fades and/or blockages of sufficient length to defeat the intended error correction action of the combination of forward error correction coders 30 and their complimentary maximum likelihood decoders 28. This is accomplished by reordering the time of occurrence of the bits or symbols of a message at the transmitter to randomly and uniformly distribute them over a time window equal to the duration of the interleaver. This causes adjacent bits or symbols of the input message to be separated as far from one another as possible. If the interleaved message bits or symbols suffer an error burst in their transport to the receiver, the action of a complimentary de- interleaver at the receiver to restore the original order scatters the errored bits or symbols over the entire interleaver time window, causing them to appear at the FEC decoder as a random distribution of short bursts of errored bits. The FEC decoder easily corrects the latter. It is expected that use of such interleavers in combination with FEC coders and decoders constitute part of the processing used in the end-to-end transport of messages or signals sent over the system discussed. The interleavers are inherently located after the FEC coders 30 at the transmitter 24 and before the FEC decoders 28 at the receiver 22. The duration of their time window can range from one to a multiplicity of TDM frames.

Interleavers can also be used in the form of cross-interleavers. A cross-interleaver comprises a pair of interleavers that operate on a pair of message bit streams so that each interleaver carries about half of the bits of each message stream. The bits of a message stream are pseudo randomly and uniformly split and ordered. For example, the input to the interleaver accepts a pair of message streams. The cross-interleaver acts upon the bits to generate two output cross-interleaved streams. The interleaver causes the bits of each input message stream to be split in a pseudo random manner between the two output cross- interleaved streams. Also, the bits are separated as far from one another as possible in each of a pair of cross-interleaved streams. Each of the cross-interleaved streams transports half the content of each input message. Each stream is transported over a different and diverse path. When used in combination with a parent convolutional coder, the output of which is punctured into the two message streams to form the input to the cross-interleaver, and a Viterbi decoder (e.g., using a convolutional decoder matching the parent coder), the message bit stream that was the input to the parent convolutional coder is recovered in a maximum likelihood manner at the Viterbi decoder output. This process can eliminate burst transport bit errors caused by blockages, shadowing and multipath fades encountered over direct line- of-sight satellite reception paths by mobile receivers.

To optimize mobile reception, the late broadcast signal and the delayed early broadcast signal are aligned as precisely as possible so that their corresponding symbols coincide. Delaying the received early broadcast signal by the same amount that the late broadcast signal was delayed 34 at the transmitter 24 facilitates this alignment. FIGS. 1a and 1b each illustrate the end-to-end principle involved. At the receiver 22, symbol-by-symbol alignment of the two broadcast signals is performed as precisely as possible by using a fixed delay 26 that aligns the early signal to within less than a half the broadcast signal frame period, followed by a variable delay that is adjusted to synchronize Service Control Header (SCH) preambles to a symbol in the early and late broadcast signals. SCHs are described in commonly assigned U.S. patent application Ser. No. 09/112,349, filed Jul. 8, 1998 that is incorporated herein by reference in its entirety. Such symbol alignment for the early and late broadcast signals allows for maximum likelihood combining of the symbols of the early and late signals arriving at a Viterbi decoder 28 in the receiver.

Maximum likelihood combining of the early and late signals is made possible at the transmitter 24 by deriving them from a convolution coder 30 and splitting its output into the early and late time diversity signals. A process known as puncturing accomplishes splitting, as indicated at 32. Preferably puncturing consists of selecting half the convolution-mother- coded bits for the early signal, and the other half of the bits for the late signal. The precise bits constituting each half are selected in a manner that optimizes the overall end-to-end bit error performance. At the receiver, soft decision recombination of the properly synchronized early and late parts of a broadcast stream using a soft decision Viterbi decoder results in optimized maximum likelihood combining. This recombination uses signal-to-noise ratio estimates for each bit recombined to create the maximum likelihood combining result.

Alternatively, relatively simple switching can be used instead of the maximum likelihood combining of the early and late broadcast signals. In this case, the receiver 22 switches between the early and late broadcast signals. The receiver 22 preferably outputs the late broadcast signal, unless the late broadcast signal is blocked. When it is blocked, the receiver 22 switches to the delayed early broadcast signal. Alignment using the proper delay assures that there is no time discontinuity encountered when the receiver 22 switches between the late and early broadcast signals. The alignment should be within 10 milliseconds or less to avoid audible interrupt. The signal is lost only if both the early and the late broadcast signals are blocked simultaneously. This happens only if the duration of a simultaneous blockage exceeds the delay time between the early and late signals. Viterbi maximum likelihood combining, however, has a significant signal-to-noise advantage of approximately 4.5 dB compared to the simple switching.

1.1 Implementing Time-Diversity-Only with Two Direct LOS TDM Streams from one Satellite Two TDM streams intended for mobile reception are sent from the same satellite 14. One TDM stream carries the symbols of an early broadcast signal, and the other TDM stream carries those of a late broadcast signal. The broadcast signals preferably comprise a number of broadcast channels (BCs). The number of BCs intended for mobile diversity reception can vary from one to all available. Those BCs not used for mobile diversity reception can be used for conventional non-diversity LOS service to non-mobile fixed and portable radios. The early and late BCs provide time diversity at the mobile receiver that enhances the availability of continuous reception under those dynamic blockage circumstances that can occur with a moving vehicle. The delay time 34 between the early and late BCs carried in the two TDM streams is a system parameter that is determined in the same way as described above for early and late BCs carried in the same TDM stream.

At the receiver 22, the pairs of BCs, one from the late TDM stream and the other from the delayed early TDM stream, are processed in the same way as the late and early broadcast signals described above in connection with FIG. 1a. The receiver 22 receives two TDM carriers to implement this operating mode.

1.2 Implementing Time and Space Diversity Using Two Direct Line-of Sight TDM Streams, one from Each of two Spatially Separated Satellites Two TDM streams intended for direct satellite LOS mobile reception are sent, that is, one stream 16 transporting late signals and the other stream 18 transporting early signals. The streams 16 and 18 from respective ones of two spatially separated satellites 14 and 20, as depicted in FIG. 2. This implements space diversity, as well as time diversity reception. The two satellites 14 and 20 are separated sufficiently apart in space to provide two different paths of arrival for TDM streams. Thus, an opportunity for space diversity reception is provided since, if one path is blocked, it is unlikely that the other path is also blocked. One TDM stream 16 carries late BCs, and the other TDM stream 18 carries early BCs, to provide time diversity at the receiver 22 and enhance the availability of continuous reception under dynamic blockage circumstances that occur in a moving vehicle. The delay time 34 between the early and late TDM streams is a system parameter that is determined as described above for early and late broadcast signals demultiplexed from one TDM signal.

1.3 Implementing Time and Space Diversity Using Two Direct Line-of Sight Broadcast Channels, one from each of two Spatially Separated Satellites Two broadcast channels (i.e., one BC transporting information from the late signal and the other BC transporting information from the early signal) intended for direct satellite LOS mobile reception are sent, one from each of two spatially separated satellites 14 and 20, as depicted in FIG. 2. The TDM streams 16 and 18 are not necessarily dedicated to all early or all late signals, but rather each can transport a combination of the two signals. This implements space diversity, as well as time diversity reception. The two satellites 14 and 20 are separated sufficiently apart in space to provide two different paths of arrival for TDM streams. Thus, an opportunity for space diversity reception is provided since, if one path is blocked, it is unlikely that the other path is also blocked. The early and late BCs provide time diversity at the receiver 22 and enhance the availability of continuous reception under dynamic blockage circumstances that occur in a moving vehicle. The delay time 34 between the early and late TDM streams is a system parameter that is determined as described above for early and late broadcast signals demultiplexed from one TDM signal.

At the receiver 22, pairs of broadcast signals (i.e., one carrying a late signal and another carrying an early signal) are processed in the same way as the late and early broadcast signals described above in connection with FIGS. 1a and 1b. The receiver 22 receives two TDM carriers to implement this operating mode. Space diversity is inherently implemented by the same processing circuitry that performs time diversity as previously described, that is, the maximum likelihood Viterbi combining processing 28 simultaneously implements both time diversity and space diversity. Alternatively, simple switching to select the signal with the best reception quality can be used.

As stated previously, space diversity reception results because the early broadcast signal comes from a satellite 14, the late broadcast signal comes from a satellite 20, (or vice-versa) and the satellites 14 and 20 are at different space locations, as illustrated in FIG. 2. The different space locations can be achieved using satellites at different locations along the geo- synchronous orbit, or two satellites in different elliptical orbits inclined relative to the equator and properly timed in their sidereal day phase to provide continuous space and time diversity coverage over a targeted region, for example. In the latter case, there can be three or four satellites in different highly inclined elliptical orbits, for example, which are used two at a time to achieve space diversity at high latitudes.

2. Terrestrial Re-radiation for Receivers Blocked from Satellite Line-of-Sight Any of the above direct LOS satellite diversity implementations can be combined with a network 36 of terrestrial re-radiation transmitters (FIG. 4) to overcome the blockage caused by buildings, bridges and tunnels encountered in both urban centers and rural locations where direct LOS reception from satellites may not be available and to maintain uninterrupted reception of broadcast program signals to mobile receivers. A terrestrial network 36 can contain from one to any number of stations 38 as needed for coverage of a city or highway, for example.

It is to be understood that a mobile reception option also exists which uses a satellite direct broadcast delivery system without time or space diversity and only coupled with a terrestrial re-radiation network. Such an option is effective in regions of satellite beam coverage where, for example, the LOS elevation angles to the satellite are 85° and higher and blockage by obstacles is sparse. Under such circumstances, terrestrial re-radiation is needed only in a few, relatively small isolated blocked areas. Thresholds for switching between satellite and terrestrial reception are discussed below.

To use terrestrial re-radiation of direct satellite signals repeated over the terrestrial network most beneficially, they need to be synchronized and combined with the satellite direct LOS signals at the mobile receiver. In accordance with the present invention, synchronization for implementing mobile diversity reception using one or more direct satellite LOS streams, and with or without terrestrial re-radiation, via a network 36 of terrestrial repeaters, will now be described. In the discussion that follows, the signals are assumed to be transported using time division multiplexing. This is not meant to preclude the use of other transport schemes such as frequency division multiplexing or code division multiplexing of any combination of such multiplexing methods.

Direct LOS satellite carriers equipped for space and time diversity can deliver communications to mobile units in unblocked and partially blocked rural areas with high availability using the above-described methods. Low, medium and high-rise buildings that are commonly found in cities, however, can severely block LOS satellite reception. Thus, a terrestrial re-radiation system is needed to augment LOS satellite reception and achieve high availability reception in both cities and countryside.

Figure 4:
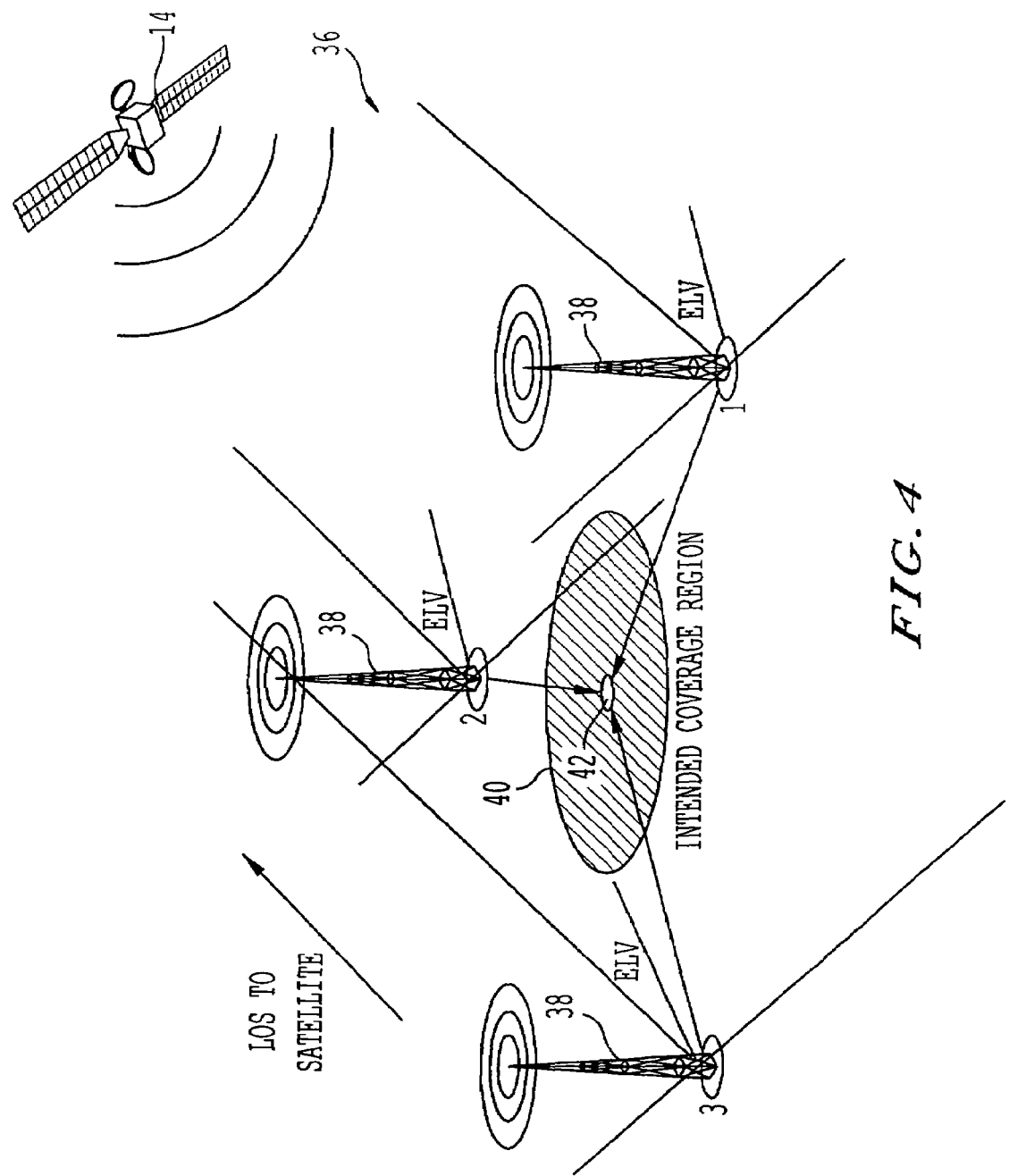
FIG. 4 illustrates a terrestrial TDM-MCM single frequency network (SFN) constructed in accordance with an embodiment of the present invention.

To overcome LOS blockage, a network 36 of terrestrial re-radiation stations 38 are provided in different locations in a city, as shown in FIG. 4. Each terrestrial re-radiation station 38 transmits a waveform designed to be robust to multipath interference and to repeat the direct LOS satellite digital TDM stream or selected components (e.g., Broadcast Channels) of that TDM stream. All of the terrestrial re-radiation stations 38 preferably transmit on essentially the same carrier frequency. The bandwidths of their waveforms coincide with one another. This is commonly referred to as a single frequency network. Applicable waveforms are, for example: 1) Time Division Multiplexed Multicarrier Modulation (TDM-MCM) which uses the multipath robust technique known as Orthogonal Frequency Division Multiplex (OFDM) to transport a TDM signal; 2) Adaptive TDM which transmits a TDM waveform containing a special periodic digital training sequence that enables a multipath adaptive equalizer implemented by means of a correlator, a multi-tap delay line and additional signal processing circuitry to train the taps of the equalizer to constructively recombine the individual multipath arrivals to recover the transmitted waveform; and 3) Code Division Multiple Access (CDMA) in which the satellite TDM waveform is divided into constituent parts such as Prime Rate Channels (PRCs) and these parts are rebroadcast in terms of a multiplicity of simultaneous CDMA signals that occupy a common bandwidth and are individually identified and discriminated at the receiver by means of digital codes assigned uniquely to each PRC. PRCs are described in the above-referenced, commonly assigned U.S. patent application Ser. No. 09/112,349, filed Jul. 8, 1998, incorporated herein by reference. A BC in a TDM broadcast waveform can be divided into PRCs, for example. The PRCs can be carried on CDMA-coded carriers. A receiver can the collect the CDMA-coded PRCs of a BC and reassemble the BC.

In the following, an embodiment using a TDM-MCM waveform for terrestrial re- radiation is selected. The term TDM-MCM waveform is used to refer to the modulation of the digital symbols of a TDM waveform received directly from the satellite on to multicarrier- modulated or MCM symbols. An important feature of this embodiment is to synchronize the TDM-MCM terrestrial re-radiated waveform to the TDM stream received from the satellite. It should be recognized that this synchronization between the TDM waveform sent via the satellite and any other waveform used for terrestrial re-radiation should take into account the propagation delay differences between the satellite and the terrestrial re-radiation stations and between the terrestrial re-radiation stations and the receivers.

2.1 Implementation of Terrestrial Re-radiation using TDM-MCM

Different satellite transport options are possible. They are: 1) one direct LOS satellite TDM stream from the same satellite carrying broadcast signals with no time or space diversity; 2) one direct LOS satellite TDM stream from the same satellite carrying both early and late broadcast signals; 3) two direct LOS satellite TDM streams from the same satellite (i.e., one stream carrying the late BCs and the other stream carrying the early BCs); and 4) two direct LOS satellite TDM streams from different satellites (i.e., one TDM stream carrying late BCs and the other TDM stream carrying early BCs, or each stream carrying a combination of late and early BCs with each late BC having an early companion in the other TDM stream).

In the first case, where no time or space diversity is used, the TDM stream carrying the BCs is received by and directly repeated by the terrestrial re-radiation station 38 using a TDM-MCM waveform. In this case the receiver introduces a delay in its LOS satellite TDM reception to account for processing and transport delays encountered in the terrestrial re- radiation path. In the other three cases, the TDM stream carrying the early BCs is delayed and repeated by the terrestrial re-radiation station 38 using a TDM-MCM waveform.

The TDM bit stream or bit streams selected and carried on the TDM-MCM waveform preferably carry the identical content as that coming from the satellite. Alternatively, TDM-MCM can select from the satellite TDM streams only those BCs intended for mobile reception. In the latter case, locally injected Broadcast Channel content intended for mobile service receivers can replace the remaining TDM capacity.

In accordance with the present invention, for the configurations involving time diversity reception, a delay is inserted at each terrestrial station which is adjusted to cause the time of arrival of the early BC at the center of terrestrial coverage to coincide with the arrival of it's companion late BC from the satellite. This delay includes adjustments for the distance differences between each station 38 and the satellite, as well as distance differences between each station 38 and the center 42 of the terrestrial coverage region 40, and the processing delay involved in converting the LOS TDM stream into the TDM-MCM stream.

By requiring near coincidence of the arrival times of the terrestrial re-radiation signal and the late satellite signal at the center 42 of terrestrial coverage, a minimum of difference in their arrival times occurs within and at the periphery of the terrestrial coverage region 40. Consequently, when leaving or entering the terrestrial coverage region 40, the "hand-off" between the terrestrial and satellite signals occurs without noticeable interrupt in a received audio signal, for example. This same alignment discipline, when applied at each terrestrial repeater station, causes time and phase coincidence of the MCM symbols from each terrestrial station arriving at the center of the terrestrial coverage that optimizes the quality of reception at a mobile platform. As a mobile receiver departs from the center of terrestrial coverage, the MCM arrivals become scattered in the time and phase. By design, the scatter can be as great as a guard time that is inserted in the MCM symbol period that is typically 60 microseconds and allows for departure distances of up to 9 km from the center of coverage.

In accordance with the present invention, each re-radiation transmitter re-radiates its TDM-MCM signal by ground wave propagation from a high power transmitter. The radiated power level can be as low as 0 dBW for small coverage areas with sparse blockage to 40 dBW for large coverage areas such as those in central business districts of large cities. The signal is radiated from towers at heights sufficient to overcome the blockage of the environment, taking into consideration the natural terrain features such as hills and tall buildings. Also, the signal is radiated along roadways from properly aimed narrow beam antennas on towers at heights sufficient to reach distances of 2 to 16 km via ground waves.

2.2 Hand-off Between Satellite LOS Terrestrial Re-Radiated Signals

Hand-off refers to an event that occurs when a vehicle engaged in mobile reception makes a transition between LOS TDM reception from the satellite and terrestrial TDM-MCM reception from the terrestrial SFN. Two methods for conducting the hand-off are possible. Both have already been introduced in the previous sections. One "hand-off" technique can be implemented by aligning the BC Service Control Header preambles (e.g., by aligning their correlation spikes) of the terrestrial and satellite BCs. This process precisely synchronizes the terrestrial and satellite BC symbols and implements their maximum likelihood combining by Viterbi decoder 28. Such an implementation results in a transparent, hitless hand-off.

An alternative to the above technique uses switching between the terrestrial and satellite derived signals rather than maximum likelihood combining. Mobile receivers tune to and listen to one or both of the LOS satellite TDM carriers and the terrestrial SFN re-radiation TDM-MCM carriers. Both carrier types transport the same BCs. At any given instant, a receiver 22 preferably selects that signal (i.e., LOS TDM or TDM-MC) that provides the best BC quality.

Reception quality can be measured in terms of the bit error rate (BER) in each received bit stream. Switching is done in terms of BER difference as follows:

Switch From LOS TDM to TDM-MCM, when TDM-MCM BER≦LOS TDM BER−Δ1BER; and

Switch From TDM-MCM to LOS TDM when LOS TDM BER≦TDM-MCM BER−Δ2BER

Use of Δ1BER and Δ2BER, as indicated above, prevents chatter when switching between LOS TDM and TDM-MCM. By making Δ2BER>Δ1BER, the switch from TDM-MCM to LOS TDM is more difficult than from LOS TDM to TDM-MCM. This is desirable because, when entering the city coverage area, the receiver 22 should preferably stay with the TDM-MCM once it is captured by the TDM-MCM. As an example of this operation, assume that in the reinforced region 40 the LOS TDM BER=$10^{-1}$ and that Δ1BER=Δ2BER=$10^{-2}$. The switch from LOS TDM to TDM-MCM occurs at 0.01−0.001=0.009, and the switch from TDM-MCM to LOS TDM again occurs at TDM-MCM occurs at an =0.01=0.001= 0.011. Thus, it is easier to go from LOS TDM to TDM-MCM than from TDM-MCMback to LOS TDM By making Δ2BER=$4\times10^{-2}$ the switch back from TDM-MCM to LOS TDM occurs at an TDM-MCM BER=0.015 making it more difficult to return to LOS TDM once the terrestrial MCM has been selected. Some other equivalent quality measure, such as signal- to-noise ratio, can be used instead of BER.

2.3 Implementation of the Terrestrial Tdm-Mcm Transport

The data symbols of the satellite LOS TDM stream are preferably precisely aligned to the OFDM subcarriers within a TDM-MCM data symbol to achieve optimal SFN operation. In the illustrated embodiment, each TDM data symbol contains 2 bits. In accordance with the present invention, precisely the same 2 bits are assigned to the same OFDM subcarrier in the TDM-MCM waveform generated at each terrestrial re-radiation of an SFN 40. This alignment is performed identically at each terrestrial re-radiation station 38 since any deviation from this alignment at any one terrestrial re-radiation station of a network can turn its TDM-MCM into an interferer and consequently degrade the quality of reception.

Figure 5:
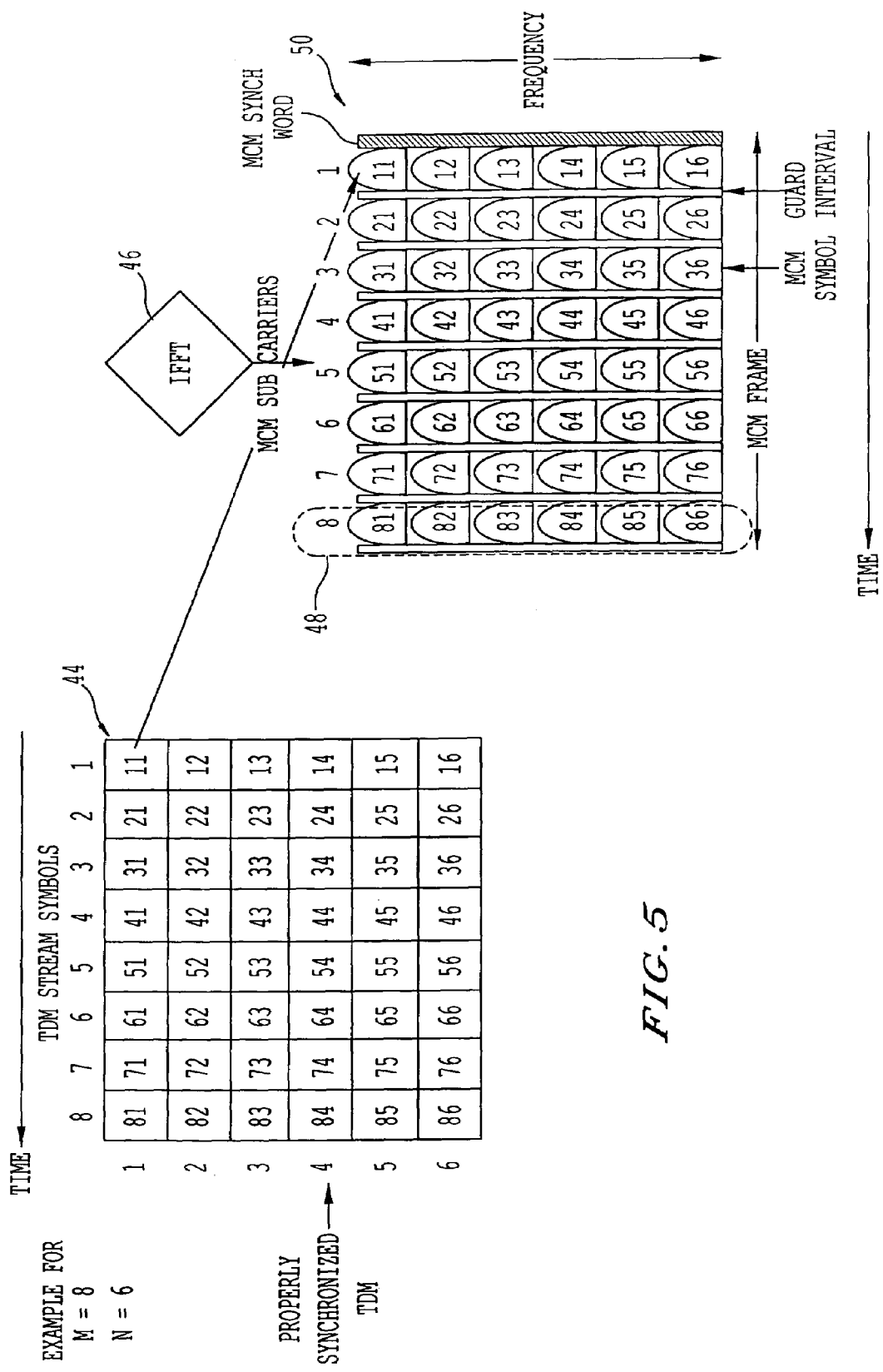
FIG. 5 illustrates synchronization of TDM symbols to MCM subcarriers in accordance with an embodiment of the present invention.

Alignment of the TDM data symbols to each MCM symbol of the TDM-MCM waveform uses a process illustrated in FIG. 5. First, the TDM data symbols from the TDM stream carrying the early BCs received from the satellite are arrayed in a sequence of time contiguous blocks. Each TDM symbol carries 2 bits. Each block 44 of TDM data symbols contains M columns and N rows. M and N are design parameters determined by design details of the TDM-MCM transmultiplexer. The earliest TDM symbols fill the earliest row of the array, the next earliest the next row and so on until the last row is filled with the last TDM symbols of the frame. Each block 44 is supplied to the input of an Inverse Fast Fourier Transform (IFFT) 46. The action of the IFFT forms one MCM symbol 48 containing N OFDM carriers, that is, one carrier for each TDM data symbol of a row. Each OFDM carrier is differential QPSK modulated relative to an added phase reference carrier. Thus, each MCM symbol contains N+1 carriers. The process is repeated sequentially for all M columns of the TDM data symbol block to form a complete MCM symbol frame 50. The M columns of a TDM block 44 form M MCM time sequential symbols 48, each having N carriers plus one phase reference carrier. This constitutes an TDM-MCM frame 50. The total number of TDM data symbols carried per TDM-MCM frame 50 is M×N. It is to be understood that the values M=8 and N=6 shown in FIG. 5 are for illustrative purposes only. Such values are typically on the order of M=960 and N=116, for example.

For optimum operation of an TDM-MCM single frequency network, each TDM- MCM symbol 48 transmitted from each terrestrial re-radiation station 38 in the network 36 carries the same TDM data symbols of the block on the same carriers of each MCM symbol; otherwise, constructive recombination will not occur among the multiplicity of TDM-MCM symbols 48 arriving at a receiver 22 from the various terrestrial re-radiation stations 38 of an SFN 36. The TDM-to-MCM symbol synchronization and alignment process is performed independently but in precisely the same way at each terrestrial re-radiation station.

Figure 6:
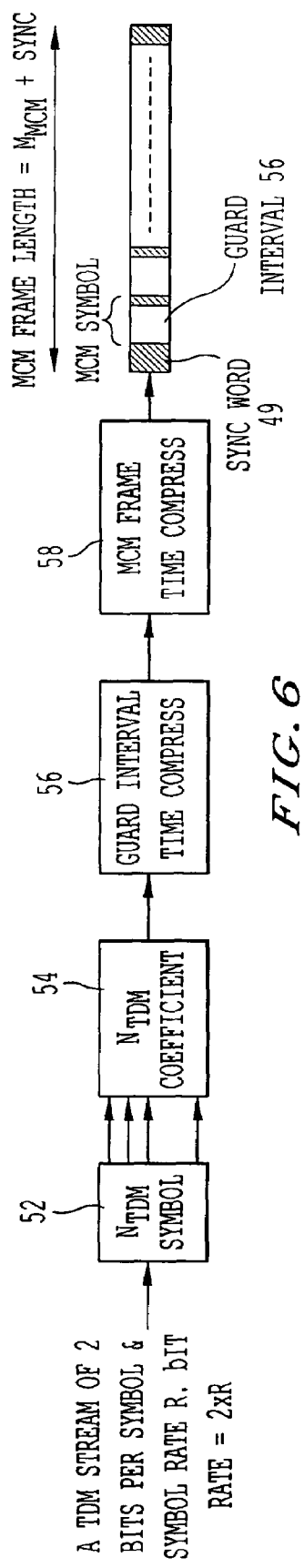
FIG. 6 illustrates TDM symbol-to-MCM subcarrier modulation in accordance with an embodiment of the present invention.

Formation of the MCM symbols 48 into TDM-MCM frames 50 is further illustrated in FIG. 6. A TDM stream transporting 2 bits per symbol at a symbol rate R (e.g., bit rate $B_R$= 2×R) is presented to the input of the IFFT in sets of $N_{TDM}$ symbols 52. The symbols are preferably stored as complex I and Q values and arrayed in columns prior to input to a IFFT. An IFFT 46 of size $2^n$ transforms NTDM TDM symbols 52 into NTDM quadrature phase shift keying (QPSK) carriers to generate each TDM-MCM symbol, as indicated at 54 in FIG. 6. The I and Q values referred to previously directly determine the phase of each QPSK modulated MCM OFDM carrier. Each TDM-MCM symbol therefore has NTDM OFDM carriers that occupy a period having duration $T_{sym}=N_{TDM}/R$. Consequently, the MCM symbol rate= $R/N_{TDM}$. The number of time domain samples per period=$2^n$. Hence, the sampling rate of the time domain MCM symbol output from the IFFT 46 is $2^n R/N_{TDM}$. As indicated at 56, a guard interval that is a fraction of η of the symbol period is generated. This action results in a time compression of $(1-\eta)^{-1}$ of the IFFT output. To assemble a TDM-MCM frame, a frame synchronization word 49 is added once every $M^{MCM}$ MCM symbols, thereby further multiplying time compression by $M_{MCM}+1)/M_{MCM}$, as indicated at 58. The bandwidth of the TDM-MCM waveform is therefore $R(R/S)((1-\eta)-1)$ $(M_{MCM}+1)/M_{MCM}$.

Figure 9:
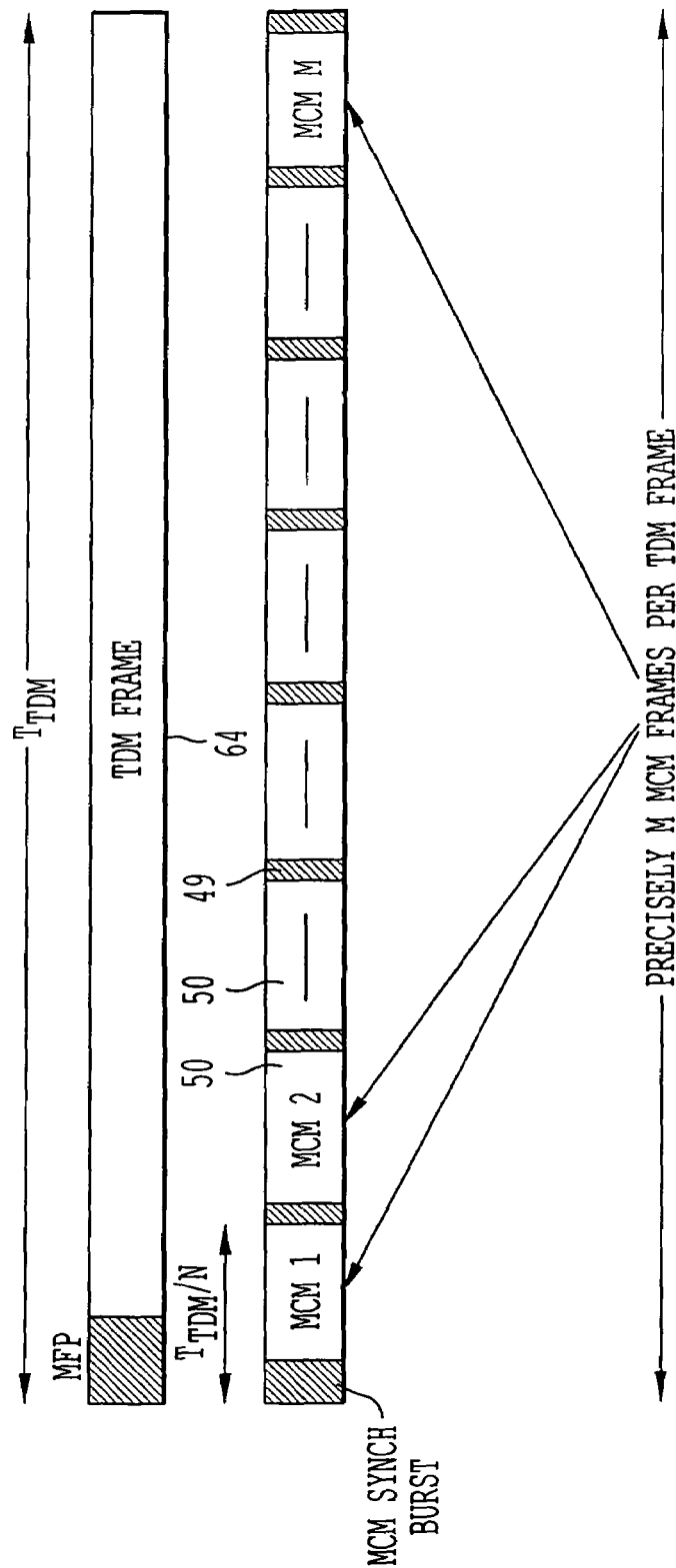
FIG. 9 illustrates the division of a TDM frame into MCM frames in accordance with an embodiment of the present invention.

The parameters used in TDM-to-MCM symbol modulation (e.g., the symbol rate R of the TDM stream, the number $N_{TDM}$ of TDM symbols per MCM symbol, the number $2^n$ of IFFT coefficients, the guard interval fraction η, and the TDM-MCM frame length $M_{MCM}$ are selected to achieve an integer number of TDM-MCM frames 50 per TDM frame 64 (FIG. 9). This choice permits use of a TDM master frame preamble (MFP) for TDM-MCM frame synchronization. The IFFT accepts $2^n$ input coefficients at a time. The number $2^n$ must be equal to or greater than $N_{TDM}$. Thus, only $N_{TDM}$ OFDM subcarrier non-zero spectrum coefficients 54 are admitted as input to the IFFT 46. Those $N_{TDM}$ values selected are the ones centered in the IFFT spectrum window. The unused IFFT coefficients at the IFFT spectrum window edges are assigned a zero value.

2.4 TDM Data Symbol to TDM-MCM Data Symbol Synchronization

As stated above, the TDM-MCM terrestrial re-radiation stations 38 preferably operate in a single frequency network (SFN) 36. The SFN 36 comprises a multiplicity of terrestrial re-radiation stations 38 that retransmit at least part of the early satellite LOS TDM waveform. All terrestrial re-radiation stations transmit in the same carrier frequency bandwidth. Each terrestrial re-radiation station rebroadcasts the same TDM-MCM waveform as all of its companions. Each terrestrial re-radiation station receives and delays the same satellite LOS TDM signal carrying the early BCs by an amount such the demodulated TDM stream carried on the TDM-MCM carrier is synchronized with the instant of arrival of the satellite LOS TDM carrying the late BCs at the center of coverage of the SFN. The symbols of the satellite LOS TDM carrying the early BCs are precisely and consistently assigned to the same OFDM carriers of the TDM-MCM data symbols, as described below in connection with FIGS. 5 and 6.

The stations 38 of the SFN 36 are located so as to optimize coverage of a city and its suburbs with a minimum number of stations. In accordance with the present invention, time delay corrections are introduced at the terrestrial re-radiation stations 38 so that the arrival times of MCM symbols carrying the same satellite TDM data symbols are nearly synchronized at a center 42 or centers of coverage. Three types of time delay corrections are needed. Two time delay corrections involve distance corrections. One is a correction for the distance differences between individual terrestrial re-radiation stations and the satellite, and a second is a correction for the distances between each terrestrial re-radiation station and the center of SFN coverage. The calculation of these two delay corrections is described below.

The third delay correction is introduced to cause the TDM-MCM signal to arrive in time phase with the satellite LOS late signal at a mobile receiver located at the center of coverage of the SFN. This must be done because the early LOS BC TDM signal from the satellite is used to generate the TDM-MCM terrestrial re-radiation signal. The arrival at the center of coverage of this latter signal must occur at nearly the same time as the arrival of late LOS BC TDM signal from the satellite. To cause this to happen, an amount equal to the delay between early and late signals must delay the early LOS BC TDM signal from the satellite. Some of this delay is due to the processing delay encountered in the TDM to TDM-MCM transmultiplex process. The remainder is introduced by a digital delay line applied to the TDM stream before the TDM to TDM-MCM transmultiplex process.

There can be a number of "centers of coverage" imbedded within an SFN to optimize overall reception within a city and its suburbs. Subsets of terrestrial re-radiation stations 38 of the SFN 36 can focus on different centers of coverage within a city and its suburbs because of distance, grouping and blockage peculiarities. These influence the first two corrections mentioned above.

3. Corrections to Re-Radiation Station Timing for Distances from the Satellite and to the Center of SFN Coverage.

As stated previously, timing corrections are made to synchronize the arrivals at the center of SFN coverage of the TDM-MCM signals re-radiated from stations 38 for:

a) different times of arrival of the satellite TDM signals at re-radiation stations 38 from the satellite 14 or satellites 14 and 20 and b) different transit times due to distance differences between the re-radiation stations 38 and the center of SFN coverage 42.

The timing differences can be introduced at each re-radiation station by delaying the TDM data symbols of the TDM stream for an appropriate time in a memory device prior to their input to IFFT 46.

3.1 Satellite to Re-Radiation Station TDM Timing Differences

Consider a network 36 of terrestrial re-radiation stations 38 that receive the TDM signal from the satellite. At elevation angles other than 90°, i.e. directly overhead, the distance between each terrestrial re-radiation station and the satellite is different. Thus, there will be differences in the slant range between each terrestrial re-radiation station location and the satellite and therefore in the times of TDM signal arrival. Also, the distances between each terrestrial re-radiating station 38 and the center of coverage 42 are different. The following scenario illustrates the magnitude of the time differences caused by the distance differences.

For illustrative purposes, a SFN re-radiation network 36 is considered which comprises a number of terrestrial re-radiation stations 38 in geographic locations chosen to adequately cover a city and it's associated metropolitan area. In relatively simple, small and confined blocked topologies, small numbers of terrestrial re-radiation stations suffice. In large, more complicated blocked topologies; large numbers of terrestrial re-radiation stations are needed.

Figure 7:
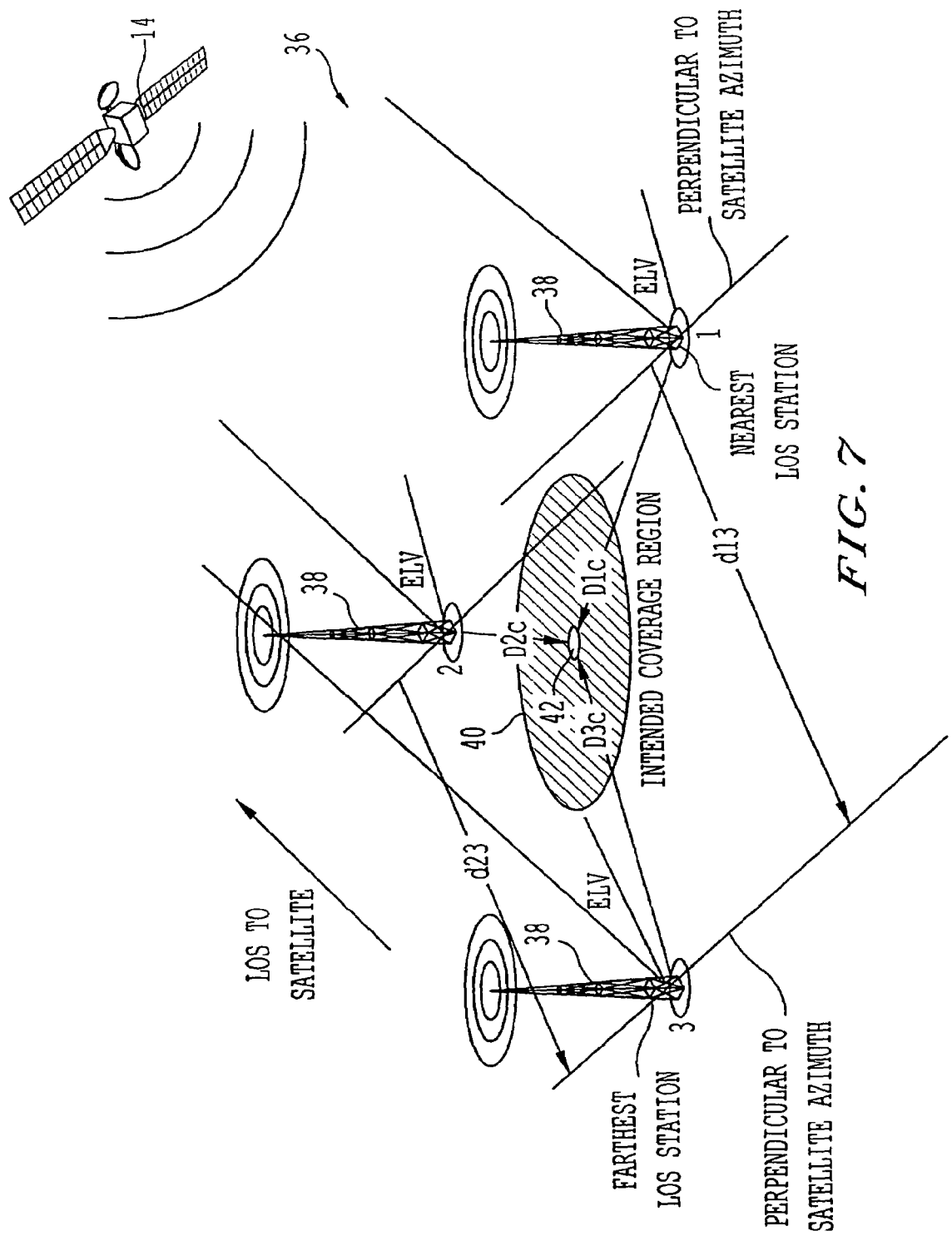
FIG. 7 illustrates the calculation of LOS delay differences between satellite and terrestrial re-radiation stations and delay differences between the terrestrial re-radiation stations and the center of SFN coverage in accordance with an embodiment of the present invention.

The method for calculating delay differences due to slant range distance differences between the terrestrial re-radiation stations 38 and the satellite 14 is shown in FIG. 7. The distance differences are measured between perpendiculars to the line-of-sight to the satellite that lie in the earth's surface at intersects at the location of each station. Designate the nearest station in 36 to the satellite as 1, the farthest as m and any intermediate as k. Let the distance difference between perpendiculars to the LOS along the earth's surface in the direction of the azimuth towards the sub-satellite point between any station k and station m be $d_{km}$. Thus, the distance between the farthest station m and 1 is $d_{1m} = d_{max}$. Note that in FIG. 7 the farthest station is numbered 3, the nearest 1 and there is one between numbered 2. Let the respective LOS slant range distances be $\Delta T_{slantk}$ and $\Delta T_{slantmax}$. Let the elevation angle to the satellite be elv at all stations. Also note that the azimuth to the sub-satellite point is assumed to be very nearly the same at all stations. Therefore, using the geometry shown in FIG. 8 for calculating the slant line-of-sight distance between stations k and m, the following relationships for differences in arrival times from the satellite apply:

$$0 < \Delta T_{slant\ k} < \Delta T_{slantmax}$$

where:

$\Delta T_{slantmax} = (d_{1m} \div c) \times \cos(elv)$ $\Delta T_{slantk} = (d_{km} \div c) \times \cos(elv)$ c=speed of light, m/s Observe that the timing correction component $\Delta T_{correctk}$ to be applied at any station k to account for the satellite TDM signal arrival time difference at receiver is given $$\Delta T_{correctk} = \Delta T_{slantmax} - \Delta T_{slant\ k}$$

Thus, the farther a station in 36 is from the satellite the lesser is the timing correction. For example, consider a case where d1m=dmax=18 km and elv=30°. For this case $\Delta T_{slantmax}$=52 μs. For a station 1, the nearest to the satellite, the correction will be $\Delta Tcorrect1 = \Delta T_{slantmax}$=52 μs. For the station at the maximum distance it will be $\Delta T_{correctm}$=0. For any other station k between, $\Delta T_{correctk}$ is given by equation above.

For SFN coverages near the sub-satellite point, the azimuth angle to the satellite at each re-radiation station 38 differs from station to station and obvious and appropriate corrections to the above equations will have to be made, e.g. the contours of constant propagation delay between a station and the satellite are actually circles on the surface of the earth having their centers at the sub-satellite point and the time differences are measured between the circles. At large distances from the sub-satellite point and within the rather limited region of an SFN coverage, the circles can be considered as straight lines.

Variations in the time differences due to satellite motion will now be considered. The calculations given above apply in the azimuth plane intersecting the satellite, the center of the earth and each terrestrial station under consideration. For a geostationary orbit satellite, the satellite's orbit position varies slightly. It is common practice to maintain the satellite's position to within a cube 50 miles on a side centered at the designated satellite orbit location. At distances of 21,300 to 25,600 miles, the resulting deviations in azimuth and elevation caused by variation in geo-stationary orbit satellite position have a negligible influence on the time correction calculations given above. There magnitude does not exceed 135 nanoseconds peak-to-peak. Similarly, there are time differences caused earth station location differences within 36. These do not exceed 31 nanoseconds peak to peak. When the two are summed, the net result does not exceed 166 nanoseconds peak-to-peak.

However, for non-geostationary orbiting satellites such as those that fly in Tundra, Molnya, Intermediate Circular Orbit (ICO) and in Low Earth Orbit LEO) orbits, the calculations performed above preferably take into account the continuously changing azimuth and elevation angles of the satellite relative to re-radiation stations 38. With regard to satellite communications technology, the calculation process is an extension of the method given above. Also, for such non-stationary orbits, the calculations need to be repeated at a rate that maintains the LOS slant path timing error to within +\−500 nanoseconds.

3.2 Guard Time & the Diameter of the Coverage of the SFN

Figure 10:
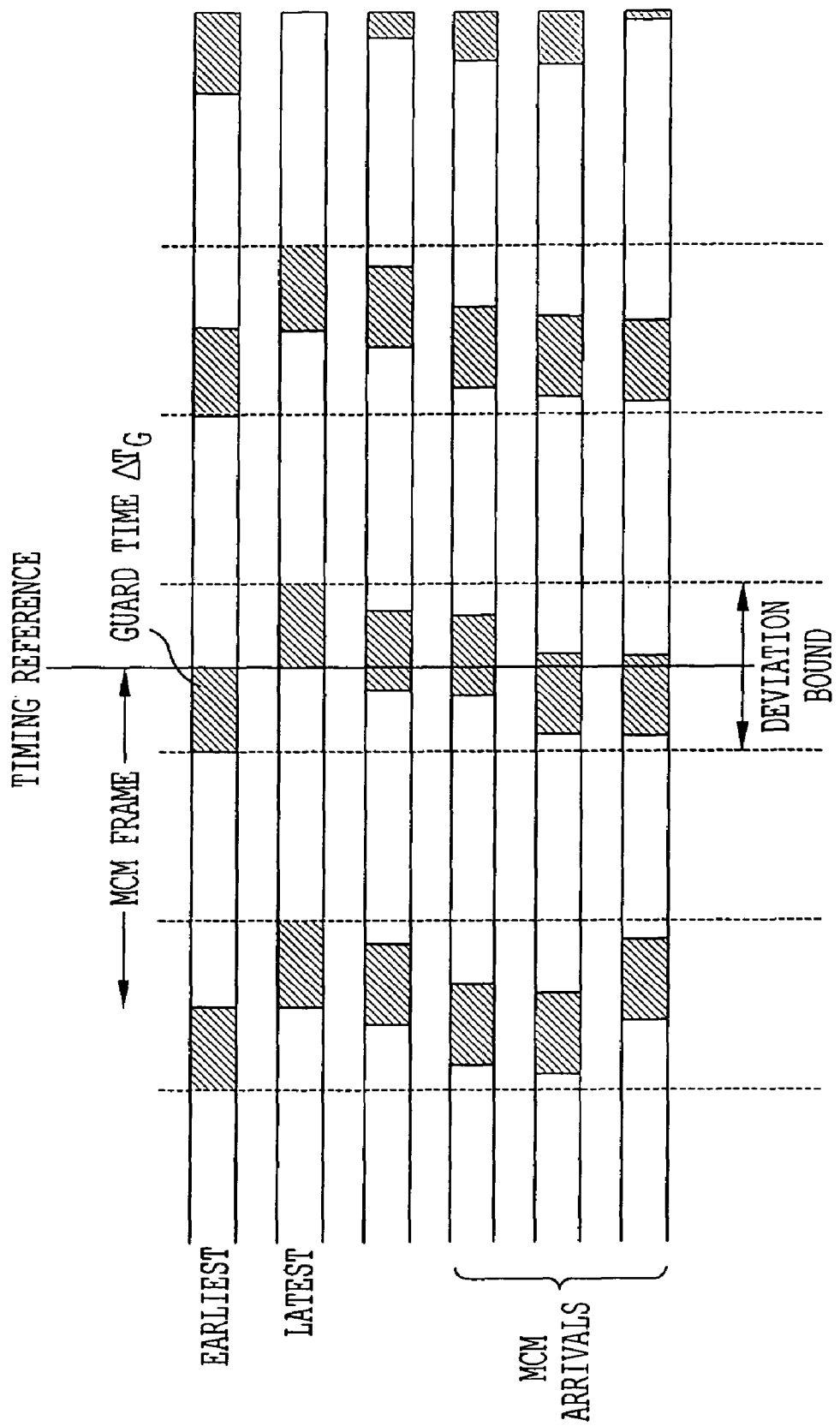
FIG. 10 illustrates the alignment of TDM-MCM frames radiated from a multiplicity of stations in a SFN having a selected diameter in accordance with an embodiment of the present invention.
Figure 11:
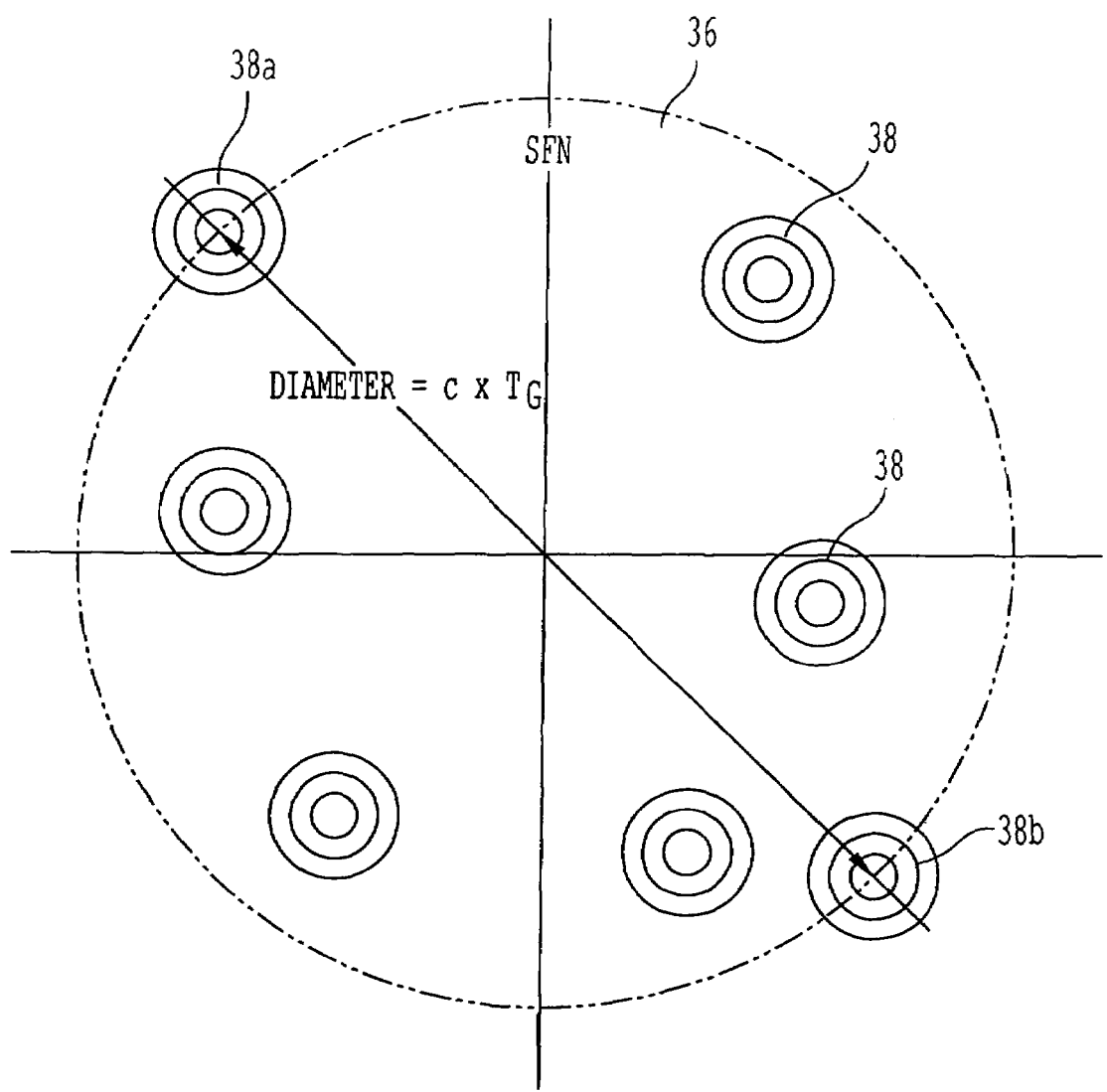
FIG. 11 illustrates the maximum diameter of deployment of terrestrial re-radiation stations in a SFN in accordance with an embodiment of the present invention.

The TDM-MCM signal transmitted from the various terrestrial re-radiation stations 38 of the SFN 36 comprises TDM-MCM frames 50 generated in the manner described above in connection with FIGS. 5 and 6. At a receiver 22 located in the intended area of coverage 40, multiple signals comprising TDM-MCM frames arrive from various re-radiation stations. The arrival times of these will overlap one another in manner illustrated FIG. 10. The spread of the overlap depends on the satellite-to-terrestrial re-radiation station distance differences and the re-radiation station-to-receiver distance differences. The TDM-MCM frames combine in a constructive manner provided that their arrival time differences at a receiver 22 do not exceed the width of the guard interval $\Delta T_G$ used to generate the TDM-MCM waveform. If this guard interval width is $\Delta T_G$, then the arrival time differences from the composite of all re-radiation stations of the SFN preferably must not exceed $\Delta T_G$, and the distance differences preferably must not exceed $c \times \Delta T_G$ where c is the speed of light. Thus, the geometry for the maximum diameter of deployment for terrestrial re-radiation stations 38 in a SFN 36 is as shown in FIG. 11, wherein one terrestrial re-radiation station transmitter 38a is diametrically opposite another 38b at a distance $D = c \times \Delta T_G$. Thus, if all terrestrial re-radiation stations are confined within a region of diameter $D = c \times \Delta T_G$, the time difference of arrival, $\Delta T_R$, of TDM-MCM frames at any receiver inside or outside the region, is $\Delta T_R \leq \Delta T_G$. If, for example, $\Delta T_G = 60$ microseconds, this diameter is 18 km.

The foregoing description assumes that the time of TDM-MCM frame transmission from each station 38 of the SFN 36 is adjusted to cause the arrivals of all frames at the geometric center 42 of the coverage region 40 to be in essentially perfect alignment, i.e. the time differences in the arrival of all of the TDM-MCM frames 50 is essentially zero. For this to occur, the time of transmission from each terrestrial re-radiation station is compensated for two types of distance differences in accordance with the present invention. As stated previously, the first type of correction is the distance difference between each station 38 and the satellite 14. The second type of correction is between the location of the station 38 and the center 42 of the coverage region 40.

3.3 Calculation Procedure for TDM-MCM Frame Timing Correction

A procedure for accomplishing the needed alignment of the TDM-MCM frames 50 at the center of terrestrial re-radiation coverage will now be discussed. This procedure is preferably independently performed at each terrestrial re-radiation station 38 of the SFN 36. FIG. 7 illustrates the deployment of terrestrial re-radiation stations 38 of the SFN 36, the distances involved in the calculations and the equations used. The steps of the procedure are followed by an illustrative example.

Reviewing the nomenclature introduced previously regarding FIG. 7, each terrestrial re-radiation station 38 is identified by an index "i" ranging from i=1 for the one at the nearest LOS distance to the satellite to i=m for the one at the farthest LOS distance to the satellite. The remaining stations in the coverage area are numbered in ascending order between 1 and m with increasing LOS distance. The horizontal distance differences, $d_{im}$, between the parallels passing through each station i and that through station m are then determined. Observe that the parallels are perpendicular to the LOS to the satellite at each station. Also observe that for the example shown in FIG. 7, m corresponds to station 3.

Figure 8:
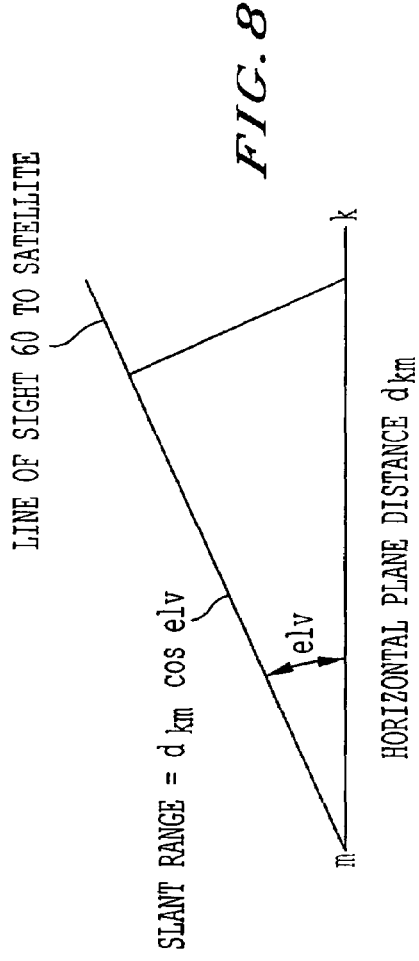
FIG. 8 illustrates conversion of horizontal distance to LOS distance for use with the TDM-MCM frame timing depicted in FIG. 7.

The horizontal distance differences $d_{im}$ are converted to LOS distance differences by multiplying by the cosine of the elevation angle, as depicted in FIG. 8. The distances $D_{ic}$ between each station i and the center of coverage c 42 is then measured. The uncorrected timing $\Delta ti$ for each station i is determined using:

$$\Delta ti = (Dic + d_{im} * \cos(elv))/s$$

where elv is the elevation angle to the satellite and s is the speed of light.

The above equation is calculated for each re-radiation station of an SFN. The minimum $\Delta ti$, designated as $\Delta ti_{min}$, is next determined. The corrected timing $\Delta Ti$ for each terrestrial re- radiation station i is then determined as follows:

$$\Delta Ti = \Delta ti - \Delta ti_{min}$$

The corrected timing $\Delta Ti$ is applied at each terrestrial re-radiation station i to align the time of arrival to achieve a zero off-set among all of TDM-MCM frames at the center of the SFN coverage. Application of this timing correction optimizes the overall operation of the TDM-MCM terrestrial re-radiation SFN. A sample calculation for the case of m=3 illustrates the principles of the present invention where $d_{n3}$ is the horizontal distance of a station n to the farthest station along the azimuth to the satellite, and $D_{cn}$ is the distance of the station n from the center of the coverage area.

| Timing corrections Applied at Each Re-radiation Station $\angle Elv = 30°$ | | | |
|---|---|---|---|
| $d_{13}$ = 18 km | $D_{1c}$ = 15 km | $\Delta t1$ = 102 µs | $\Delta T1$ = 32 µs |
| $d_{23}$ = 15 km | $D_{2c}$ = 10 km | $\Delta t2$ = 76.6 µs | $\Delta T2$ = 6.6 µs |
| $d_{33}$ = 0 km | $D_{3c}$ = 21 km | $\Delta t3$ = 70 µs | $\Delta T3$ = 0 µs |

The timing corrections given above compensate for the distance differences between the satellite and each re-radiation station plus that between each re-radiation station and the center of the SFN coverage. In addition, there must also be introduced at each station a delay to compensate for the offset between the early and late signals from the satellite and the processing delay in the TDM-MCM transmultiplexer. The total delay introduced at each station must be such as to cause precise coincidence of the late signal from the satellite with the signal delivered via each terrestrial re-radiation station. Thus, if the delay between the early and late signals is designated as $T_{EL}$ and the processing delay as $\Delta T_P$, then the total delay $\Sigma$ Ti at each station i is $$\Sigma Ti = T_{EL} - \Delta T_P - \Delta Ti$$

For the example considered above and assuming that $T_{EL}=5$ sec, $\Delta T_P=0.2$ sec, the total delays at each station are $$\Sigma T1 = 5.0 - 0.2 - 32.0 \times 10^{-6}$$
$$\Sigma T2 = 5.0 - 0.2 - 6.6 \times 10^{-6}$$
$$\Sigma T3 = 5.0 - 0.2$$

Although the present invention has been described with reference to a preferred embodiment thereof, it will be understood that the invention is not limited to the details thereof. Various modifications and substitutions will occur to those of ordinary skill in the art. All such substitutions are intended to be embraced within the scope of the invention as defined in the appended claims.

What is claimed is:

1. A method of synchronizing a selected number of time division multiplexed or TDM symbols in a TDM data stream to an equal number of the subcarriers of a time division multiplexed/multicarrier modulated or TDM-MCM symbol in a TDM-MCM waveform comprising the steps of:
   locating one of a master frame preamble (MFP) code and a distributed synchronization sequence in said TDM data stream, said TDM data stream having at least one TDM frame comprising said one of a MFP code and a distributed synchronization sequence and a plurality of said symbols, said one of a MFP code and a distributed synchronization sequence being useful to locate said TDM frame within said TDM data stream;
   generating an array using said symbols in said TDM frame, said array comprising a first number of columns and a second number of rows; and
   generating TDM-MCM symbols corresponding in number to said first number using an Inverse Fast Fourier Transform (IFFT) with said array, each of said TDM-MCM symbols having said second number of said subcarriers for respective ones of said TDM symbols in corresponding said rows, said first number of said TDM-MCM symbols corresponding to a TDM-MCM symbol frame.

2. A method as claimed in claim 1, wherein said generating step comprises the step of filling said array by providing the earliest arriving of TDM symbols in said TDM frame into the earliest generated one of said rows of said array, and continuing to sequentially fill said rows until the last of said rows is filled with the last of said TDM symbols in said TDM frame.

3. A method as claimed in claim 1, wherein said TDM data stream comprises a plurality of TDM frames, said TDM-MCM symbol frame having essentially the same duration as said TDM frame.

4. A method as claimed in claim 1, wherein said generating step comprises the step of synchronizing said TDM-MCM symbols in said TDM-MCM symbol frame to within a fraction of one of said symbols in said TDM data stream.

5. A method as claimed in claim 4, wherein the number of said TDM-MCM symbols in said TDM-MCM symbol frame is an integer number.

6. A method as claimed in claim 1, further comprising the step of providing each said TDM-MCM symbol in said TDM-MCM frame with a guard interval, the TDM-MCM symbol period corresponding to said second number divided by the number of said TDM symbols per second, said guard interval being less than said TDM-MCM symbol period.

7. A method as claimed in claim 1, further comprising the step of providing each said TDM-MCM symbol frame in said TDM-MCM waveform with a synchronization word.

8. A method as claimed in claim 1, further comprising the steps of:
   providing each said TDM-MCM symbol in said TDM-MCM frame with a guard interval, the TDM-MCM symbol period corresponding to said second number divided by the number of said TDM symbols per second, said guard interval being less than said TDM-MCM symbol period;
   providing each said TDM-MCM symbol frame in said TDM-MCM waveform with a synchronization word; and
   compressing each said MCM-TDM symbol to compensate for the insertion of said guard interval and said synchronization word in each said TDM-MCM symbol frame such that said TDM-MCM symbols having said guard interval and a time allocation corresponding to said synchronization word for the corresponding said TDM-MCM frame occupy one TDM frame period.

9. A method as claimed in claim 1, wherein said IFFT employs a number of coefficients that is greater than said second number of said symbols.

10. A method as claimed in claim 1, wherein said TDM data stream comprises a plurality of TDM frames, said generating step further comprising the step of assigning said symbols in respective said TDM frames in said TDM data stream to said subcarriers of said TDM-MCM symbols in corresponding said TDM- MCM frames.

11. An apparatus for use at a terrestrial re-radiation station comprising:
   a receiving device for receiving a time division multiplexed or TDM data stream comprising symbols, each of said symbols corresponding to a selected number of bits in said data stream; and
   a processing device connected to said receiving device and operable to locate one of a master frame preamble (MFP) code and a distributed synchronization sequence in said TDM data stream, said TDM data stream having at least one TDM frame comprising said one of a MFP code and a distributed synchronization sequence and a plurality of said bits, said one of a MFP code and a distributed synchronization sequence being useful to locate said TDM frame within said TDM data stream;
   wherein said processing device transforms said symbols in said TDM data stream into respective subcarriers to generate a time division multiplexed/multicarrier modulated or TDM-MCM waveform comprising TDM-MCM symbols, each of said TDM-MCM symbols having a selected number of subcarriers, said processing device employing said one of a MFP code and a distributed synchronization sequence to synchronize said symbols in said TDM data stream with corresponding ones of said subcarriers in respective said TDM-MCM symbols.

12. An apparatus as claimed in claim 11, wherein said processing device employs an inverse fast Fourier transform (IFFT) to transform said symbols in said TDM data stream into respective said subcarriers.

13. An apparatus as claimed in claim 12, wherein a TDM-MCM frame comprises a selected number of said TDM-MCM symbols, said processing device being operable to generate an integer number of said TDM-MCM symbols for said TDM frame in said TDM data stream.

14. An apparatus as claimed in claim 13, wherein said processing device is operable to provide each said TDM-MCM symbol frame with the same said symbols in a corresponding said TDM frame.

15. An apparatus as claimed in claim 14, wherein said processing device is operable to assign said symbols in the corresponding said TDM frame to respective carriers of said TDM-MCM symbols in said TDM-MCM symbol frame.

16. An apparatus as claimed in claim 15, wherein said apparatus is employed at a terrestrial re-radiation station that is operable to receive said TDM data stream and transform to said symbols therein into respective subcarriers to generate TDM-MCM frames comprising TDM-MCM symbols, said processing device being operable to assign said symbols in respective said TDM frames in said TDM data stream to said subcarriers of said TDM-MCM symbols in corresponding said TDM-MCM frames.

17. A system for use at a terrestrial re-radiation station comprising:
- a receiver for receiving a time division multiplexed or TDM data stream from a satellite;
- a transcoder connected to said receiver for transforming said TDM data stream into a multicarrier modulated (MCM) waveform to create a time division multiplexed/multicarrier modulated or TDM-MCM signal that is robust to terrestrial path transmission multipath and blockage vagaries and interferences; and
- a transmitter connected to said transcoder for transmitting said TDM-MCM signal;
- wherein a plurality of said systems are located at respective terrestrial re- radiation stations in a single frequency network, said systems operating substantially simultaneously using timing coordination and synchronization with respect to one another to achieve substantially seamless reception of said TDM-MCM signal over the area associated with said single frequency network.

18. A system as claimed in claim 17, wherein said terrestrial re-radiation stations are geographically located to serve a city and its surrounding suburban regions.

* * * * *